United States Patent
Yapici et al.

(10) Patent No.: US 12,441,963 B2
(45) Date of Patent: Oct. 14, 2025

(54) LOW-MOLECULAR GELLING AGENT AS FRAGRANT SUBSTANCE DISPENSING SYSTEM

(71) Applicant: Henkel AG & Co. KGaA, Duesseldorf (DE)

(72) Inventors: Filiz Yapici, Duesseldorf (DE); Peter Schmiedel, Duesseldorf (DE); Boray Torun, Duesseldorf (DE); Danuta Bedrunka, Dormagen (DE); Daniel Harms, Grossefehn (DE); Mahdis Hesami, Duesseldorf (DE); Anja Von Kathen, Wuppertal (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 645 days.

(21) Appl. No.: 17/781,381

(22) PCT Filed: Dec. 15, 2020

(86) PCT No.: PCT/EP2020/086238
§ 371 (c)(1),
(2) Date: Jun. 1, 2022

(87) PCT Pub. No.: WO2021/122608
PCT Pub. Date: Jun. 24, 2021

(65) Prior Publication Data
US 2023/0066457 A1   Mar. 2, 2023

(30) Foreign Application Priority Data
Dec. 20, 2019   (EP) .................................... 19218999

(51) Int. Cl.
*C11D 3/50* (2006.01)
*A61K 8/06* (2006.01)

(52) U.S. Cl.
CPC ................... *C11D 3/505* (2013.01)

(58) Field of Classification Search
CPC ........ A61K 8/062; A61K 8/922; A61K 8/042; A61K 8/11; C11D 3/505; A61Q 13/00; D06M 13/005
USPC ....................................................... 512/4, 1
See application file for complete search history.

(56) References Cited

U.S. PATENT DOCUMENTS

| | | |
|---|---|---|
| 5,340,390 A | 8/1994 | Magauran et al. |
| 6,080,708 A | 6/2000 | Glenn, Jr. et al. |
| 2017/0027823 A1 | 2/2017 | Weissbrodt et al. |
| 2019/0136148 A1 | 5/2019 | Hölscher et al. |
| 2022/0142332 A1* | 5/2022 | Subinya .................. A45D 37/00 |

FOREIGN PATENT DOCUMENTS

| | | | |
|---|---|---|---|
| DE | 102008061045 A1 | 10/2009 | |
| EP | 2932956 A1 | 10/2015 | |
| WO | 0240627 A2 | 5/2002 | |
| WO | 2008037697 A1 | 4/2008 | |
| WO | 2008098387 A1 | 8/2008 | |
| WO | WO-2011067732 A1 * | 6/2011 | ............. A61L 9/012 |
| WO | 2016200761 A2 | 12/2016 | |
| WO | 2017140336 A1 | 8/2017 | |

OTHER PUBLICATIONS

European Search Report from parallel EP-application No. 19 218 999.1 dated Jun. 24, 2020, 10 pages, for information purpose only.
Anonymous, "Anti-Marks Beauty Cream", Databases GNPD, 2017, 3 pages.
Anonymous, "Multi Expert Face Cream", Database GNPD, 2017, 4 pages.
Anonymous, "Moisturising Hand Cream", Database GNPD, 2015, 2 pages.
International Search Report from parallel PCT-appliation PCT/EP2020/086238 dated Mar. 16, 2021, 6 pages, for Information purpose only.
N. Goyal et al., "Tetrahedron 2010", 66(32), 5962-5971, abstract, 3 pages.
Alexander J. Kleinsmann et al., "Phenylalanine-containing cyclic dipeptides - the lowest molecular weight hydrogelators based on unmodified proteinogenic amino acids", Chem. Commun. 2013, pp. 7818-7820, vol. 49, The Royal Society of Chemistry.
P. Kirilov et al., "Aqueous dispersions of organogel nanoparticles—potential systems for cosmetic and dermo-cosmetic applications", International Journal of Cosmetic Science, 2014, pp. 336-346, vol. 36, Society of Cosmetic Scientists and the Societe Francaise des Cosmétologie.
Plamen Kirilov et al., "A new type of colloidal dispersions based on nanoparticles of gelled oil", Colloids and Surfaces A: Physicochem. Eng. Aspects, 2008, pp. 1-7, vol. 328.
Plamen Kirilov et al., "Rheological Characterization of a New Type of Colloidal Dispersion Based on Nanoparticles of Gelled Oil", 2009, pp. 11101-11108, abstract, 2 pages, Journal of Physical Chemistry B, vol. 113(32).

* cited by examiner

*Primary Examiner* — Jessica Whiteley
(74) *Attorney, Agent, or Firm* — Blank Rome LLP

(57) ABSTRACT

A perfume oil storage composition may include at least one low-molecular gelling agent, at least one perfume oil and water, the low-molecular gelling agent forming a dispersed phase together with the perfume oil. Furthermore, a method may include treating surfaces and/or textile washing and/or textile care with the perfume oil storage composition.

18 Claims, 1 Drawing Sheet

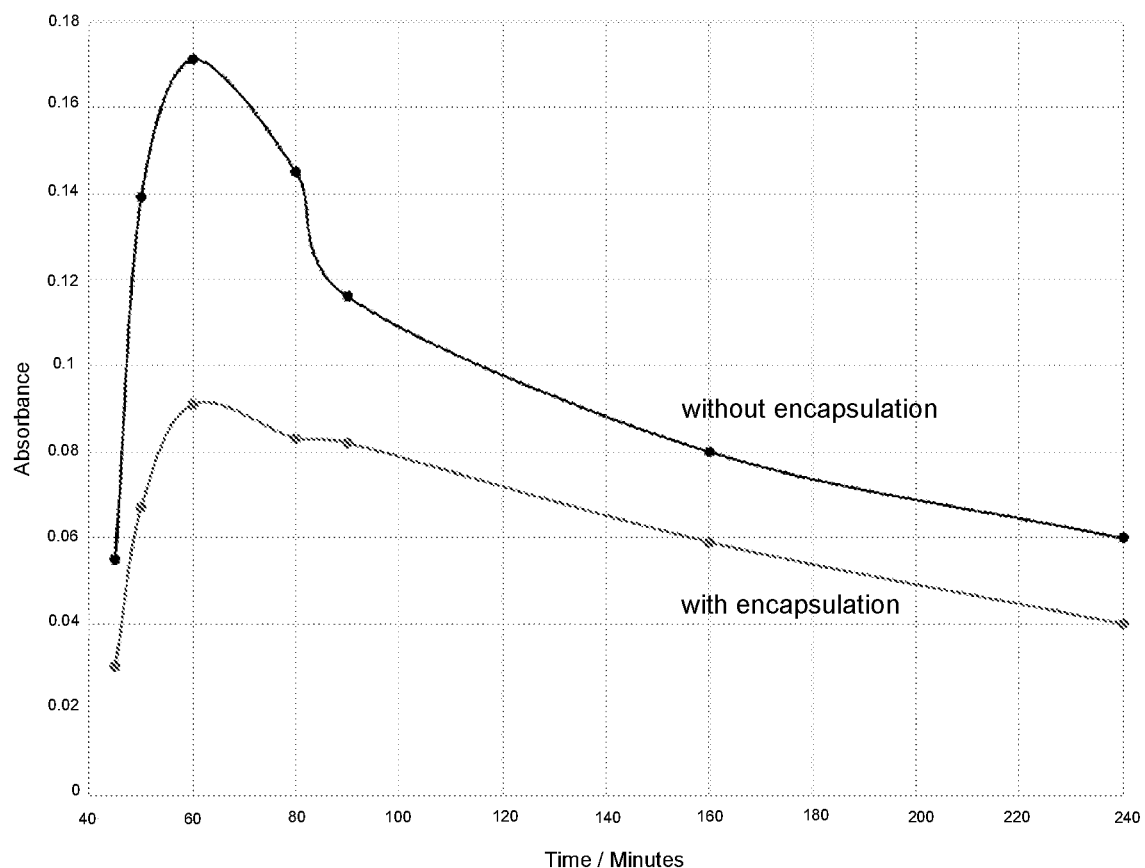

LOW-MOLECULAR GELLING AGENT AS FRAGRANT SUBSTANCE DISPENSING SYSTEM

CROSS-REFERENCE TO RELATED APPLICATION

The present application is a national stage entry according to 35 U.S.C. § 371 of PCT application No.: PCT/EP2020/086238 filed on Dec. 15, 2020; which claims priority to European patent application 19218999.1, filed on Dec. 20, 2019; all of which are incorporated herein by reference in their entirety and for all purposes.

TECHNICAL FIELD

The present disclosure relates to a perfume oil storage composition comprising at least one low-molecular gelling agent as described herein, at least one perfume oil, and water. Furthermore, the present disclosure is directed to a method for preparing such a perfume oil storage composition, to agents comprising such a perfume oil storage composition, to the use of such agents for treating surfaces and/or in textile washing and/or in textile care, to methods for the use thereof and to the use of a low-molecular gelling agent for stabilizing a perfume oil in water or an aqueous solution.

BACKGROUND

The washing, cleaning and treatment agents on the market, including cosmetic products, are usually perfumed. In addition to the actual perfuming by the free fragrant substances, for example in the form of perfume oils, encapsulated perfumes are increasingly also used. Consumers desire both a sufficient intrinsic scent of the product as well as for it to mask "bad" secondary odors. Furthermore, long-lasting and fresh perfumes are desired. Properties of this type can be achieved in an advantageous manner by the use of encapsulated fragrant substances. The fragrant substances enclosed in microcapsules can be released, for example, by mechanical stress, such as friction, and thus in a controlled manner.

Synthetic polymers are largely used for the encapsulation and the encapsulation takes place in most cases by interface polymerization on the surface of finely distributed fragrant substance droplets in an aqueous phase.

However, synthetic polymers as carrier material fall under the definition of microplastics. By definition, solid and insoluble plastics materials smaller than 5 mm fall under the term "microplastics" (U.S. National Oceanic and Atmospheric Administration).

The objective was therefore to provide a microplastic-free storage and carrier system for benefit agents, in particular perfume oils, which allows controlled release of the benefit agent, in particular the perfume oil, over a longer period of time.

SUMMARY

It has surprisingly been found that this object can be achieved by a stable dispersion, for example in the form of an oil-in-water emulsion, the dispersed phase of which comprises a perfume oil stabilized by a low-molecular gelling agent.

In a first aspect, a perfume oil storage composition may include:
a) at least one low-molecular gelling agent;
b) at least one perfume oil; and
c) water,
the composition being a dispersion, for example in the form of an oil-in-water emulsion, the dispersed phase of which comprises the at least one low-molecular gelling agent and the at least one perfume oil. In various embodiments, the dispersed phase is in the form of (stably dispersed) particles, the at least one low-molecular gelling agent forming a matrix or shell that encapsulates the at least one perfume oil.

In a further aspect, a method for preparing a perfume oil storage composition as described herein where the method may include the following steps:
a) providing a mixture comprising at least one low-molecular gelling agent and at least one perfume oil;
b) dispersing the mixture from step a) in water in order to obtain a dispersion, for example an oil-in-water emulsion, the dispersed phase of which comprises the at least one low-molecular gelling agent and the at least one perfume oil.

In a further aspect, a low-molecular gelling agent may be used for stabilizing at least one perfume oil in water or in an aqueous solution.

In a further aspect, an agent may include at least one perfume oil storage composition as described herein, the agent being a washing, cleaning or treatment agent.

In yet another aspect, an agent as described herein may be used for treating surfaces and/or in textile washing and/or in textile care.

Finally, in a final aspect, a method for treating a surface or for washing and/or caring for textiles may include using an agent as described herein.

These and other aspects, features, and advantages will become apparent to a person skilled in the art through the study of the following detailed description and claims. Any feature from one aspect can be used in any other aspect. Furthermore, it will readily be understood that the examples contained herein are intended to describe and illustrate, but not to limit, the invention and that, in particular, the invention is not limited to these examples.

Unless indicated otherwise, all percentages indicated are percentages by weight, in each case based on the total weight of the corresponding composition. Numerical ranges that are indicated in the format "from x to y" also include the stated values. If several preferred numerical ranges are indicated in this format, it is readily understood that all ranges that result from the combination of the various endpoints are also included.

"At least one," as used herein, refers to 1 or more, for example 1, 2, 3, 4, 5, 6, 7, 8, 9 or more.

"Approximately," as used herein in numerical terms, means the corresponding value ±10%, preferably ±5%.

BRIEF DESCRIPTION OF THE DRAWING

FIG. 1 shows the integrals of the aliphatic $CH_x$ band peaks of an FTIR gas-phase spectrum of emulsion E1 (examples) and of the FTIR gas-phase spectrum of the reference emulsion (examples) against time (see example 3).

DETAILED DESCRIPTION

As has surprisingly been found, the olfactory stability of a conventional used perfume in the end product, i.e. for example in a liquid washing agent, can be significantly increased by using a perfume oil storage composition comprising a low-molecular gelling agent, a perfume oil and water compared to conventionally dosed perfume in the same end product while at the same time avoiding the use of microplastics.

Accordingly, a first objective is a perfume oil storage composition comprising a) at least one low-molecular gelling agent, b) at least one perfume oil and c) water, the composition being a dispersion, for example an oil-in-water emulsion, the dispersed phase of which comprises the at least one low-molecular gelling agent and the at least one perfume oil.

In some embodiments, the perfume oil storage composition may further contain at least one water-miscible solvent, for example, but not limited to, selected from mono- and polyhydric alcohols, in particular polyhydric alcohols which are liquid under standard conditions (20° C., 1013 mbar). In this context, suitable water-miscible solvents can be selected, for example, from ethanol, n-propanol, i-propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, and mixtures of these solvents.

In the context, the term "low-molecular gelling agent" refers to compounds of which the molecules have a molar mass of less than 1000 g/mol and can form, by non-covalent interactions, for example, but not limited to, hydrogen bonding, π-π stacking and van der Waals forces, a network of fibers in a liquid matrix. Gels formed in this way are thermoreversible and, moreover, can be completely biodegraded. In particular, the gels formed by low-molecular gelling agents do not fall under the definition of microplastics.

Accordingly, some embodiments are characterized in that the at least one low-molecular gelling agent, as defined herein, has a molar mass of less than 1000 g/mol.

In various further embodiments, compounds which fall under the above definition of low-molecular gelling agents are selected in particular from the group consisting of A) compounds from the group of benzylidene alditols;
B) hydrogenated castor oil;
C) compounds from the group of diarylamidocystines;
D) compounds from the group of N-alkylgluconamides;
E) compounds from the group of 2,5-diketopiperazines; and
F) compounds from the group of glucosamines.

Compounds A) from the group of benzylidene alditols correspond, in particular to compounds which are defined by the following formula (I):

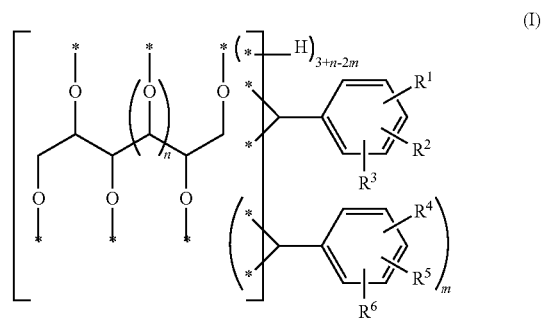

wherein, in the compounds according to formula (I),

*— represents a covalent single bond between an oxygen atom of the alditol backbone and the provided group, n represents 0 or 1, preferably 1, m represents 0 or 1, preferably 1, $R^1$, $R^2$ and $R^3$ represent, independently of one another, a hydrogen atom, a halogen atom, a $C_1$-$C_4$ alkyl group, a cyano group, a nitro group, an amino group, a carboxyl group, a hydroxyl group, a —C(═O)—NH—$NH_2$ group, a —NH—C(═O)—($C_2$-$C_4$ alkyl) group, a $C_1$-$C_4$ alkoxy group, or a $C_1$-$C_4$ alkoxy $C_2$-$C_4$ alkyl group, wherein two of the groups can form, together with the remainder of the molecule, a 5-membered or 6-membered ring, $R^4$, $R^5$ and $R^6$ represent, independently of one another, a hydrogen atom, a halogen atom, a $C_1$-$C_4$ alkyl group, a cyano group, a nitro group, an amino group, a carboxyl group, a hydroxyl group, a —C(═O)—NH—$NH_2$ group, a —NH—C(═O)—($C_2$-$C_4$ alkyl) group, a $C_1$-$C_4$ alkoxy group, or a $C_1$-$C_4$ alkoxy $C_2$-$C_4$ alkyl group, wherein two of the groups can form, together with the remainder of the molecule, a 5-membered or 6-membered ring.

Due to the stereochemistry of the alditols, it should be mentioned that benzylidene alditols and as described above are suitable in the L configuration or in the D configuration or a mixture of the two. Due to natural availability, the benzylidene alditol compounds are preferably used in the D configuration. It has been found to be preferable for the alditol backbone of the benzylidene alditol compound according to formula (I) to be derived from D-glucitol, D-mannitol, D-arabinitol, D-ribitol, D-xylitol, L-glucitol, L-mannitol, L-arabinitol, L-ribitol, or L-xylitol.

Particularly preferred benzylidene alditol compounds are those which are characterized in that $R^1$, $R^2$, $R^3$, $R^4$, $R^5$ and $R^6$ according to formula (I) independently represent a hydrogen atom, methyl, ethyl, chlorine, fluorine or methoxy, preferably a hydrogen atom.

n according to benzylidene alditol compound of formula (I) preferably represents 1.

m according to benzylidene alditol compound formula (I) preferably represents 1.

Benzylidene alditol compounds of formula (I) which fall within the definition of formula (I-1) below:

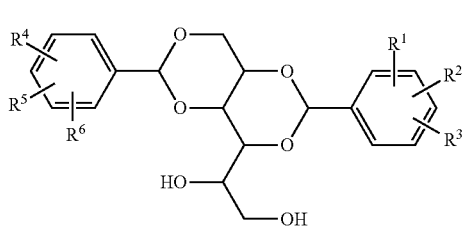

wherein, in the compounds of formula (I-1), $R^1$, $R^2$, $R^3$, $R^4$, $R^5$ and $R^6$ are as defined in formula (I). Most preferably, according to formula (I-1), $R^1$, $R^2$, $R^3$, $R^4$, $R^5$ and $R^6$ represent, independently of one another, a hydrogen atom, methyl, ethyl, chlorine, fluorine, or methoxy, preferably a hydrogen atom.

Most preferably, compounds A) are used which are selected from the group consisting of 1,3:2,4-di-O-benzylidene-D-sorbitol; 1,3:2,4-di-O-(p-methylbenzylidene)-D-sorbitol; 1,3:2,4-di-O-(p-chlorobenzylidene)-D-sorbitol; 1,3:2,4-di-O-(2,4-dimethylbenzylidene)-D-sorbitol; 1,3:2,4-di-O-(p-ethylbenzylidene)-D-sorbitol; 1,3:2,4-di-O-(3,4-dimethylbenzylidene)-D-sorbitol, or mixtures of the above.

In various embodiments, a compound (A) is in particular 1,3:2,4-di-O-benzylidene-D-sorbitol (DBS).

Another suitable low-molecular gelling agent is hydrogenated castor oil (HCO) B). Commercially available compounds include THIXCIN® R from Rheox Inc. (now Elementis). Additional examples of suitable HCOs can be found in U.S. Pat. No. 5,340,390.

HCO, as used herein, encompasses any hydrogenated castor oil or derivative thereof. Castor oils include glycerides, in particular triglycerides, bearing $C_{10}$-$C_{22}$ hydroxyalkyl or hydroxyalkenyl groups. Hydrogenation converts double bonds in the starting oil to produce saturated hydroxyalkyl groups such as hydroxystearyl groups. HCO can therefore be selected from, for example, trihydroxystearin, dihydroxystearin and mixtures thereof. Preferred low-molecular gelling agents of this type are also described, for example, in U.S. Pat. No. 6,080,708 and WO 02/40627. The castor oils used herein are preferably non-alkoxylated, in particular non-ethoxylated.

Further compounds which fall under the definition of low-molecular gelling agents and are suitable are compounds C) from the group of diarylamidocystines. Such compounds correspond, in particular to compounds of the following formula (II):

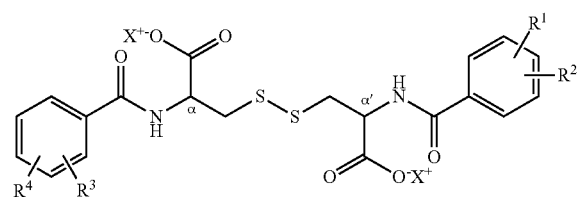

Compounds of formula (II) contain at least two stereocenters (configurational isomers) on the alpha carbon atom of the structural fragment of the compound of formula (II) that is derived from the amino acid cysteine (see marking α and α').

Each of these stereocenters can, independently of each other, represent the L or D stereoisomer. It is preferred for a compound of formula (II) to be derived from the L-stereoisomer of cysteine.

In the compounds of formula (II), each $X^+$ represents, independently, a hydrogen atom or an equivalent of a cation, and $R^1$, $R^2$, $R^3$ and $R^4$ each represent, independently of one another, a hydrogen atom, a halogen atom, a $C_1$-$C_4$ alkyl group, a $C_1$-$C_4$ alkoxy group, a $C_2$-$C_4$ hydroxyalkyl group, a hydroxyl group, an amino group, an N—($C_1$-$C_4$ alkyl)amino group, an N,N-di($C_1$-$C_4$ alkyl)amino group, an N—($C_2$-$C_4$ hydroxyalkyl)amino group, an N,N-di($C_2$-$C_4$ hydroxyalkyl)amino group, or $R^1$ with $R^2$ or $R^3$ with $R^4$ forms a 5-membered or 6-membered annulated ring, which is optionally substituted with at least one group selected from a $C_1$-$C_4$ alkyl group, $C_1$-$C_4$ alkoxy group, $C_2$-$C_4$ hydroxyalkyl group, hydroxyl group, amino group, N—($C_1$-$C_4$ alkyl)amino group, N,N-di($C_1$-$C_4$ alkyl)amino group, N—($C_2$-$C_4$ hydroxyalkyl)amino group, N,N-di($C_2$-$C_4$ hydroxyalkyl)amino group.

In some embodiments, particular preference is given in particular to those compounds C) of the formula (II) in which $R^1$=$R^2$=$R^3$=$R^4$=hydrogen atom; and $X^+$ in each case independently represents a hydrogen atom or an equivalent of a cation (N,N'-dibenzoylcystine, also referred to as DBC for short). In some embodiments, N,N'-dibenzoyl-L-cystine in particular is particularly preferred.

Further suitable low-molecular gelling agents are also compounds D) from the group of N-alkylgluconamides. Such compounds are, in various embodiments, selected in particular from the group of compounds represented by the following formula (III)

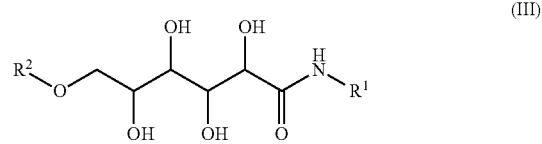

wherein, in the compounds of formula (III), $R^1$ represents a linear or branched, substituted or unsubstituted $C_4$-$C_{12}$ alkyl group, wherein each substituent is independently selected from the group consisting of F, Cl, Br and I; and $R^2$ represents a hydrogen atom or a substituted or unsubstituted benzoyl group, wherein each substituent is independently selected from the group consisting of F, Cl, Br, I, $C_1$-$C_3$ alkyl and $C_1$-$C_3$ alkoxy.

In some embodiments, particular preference is given to compounds D) in which, according to formula (III), $R^1$ denotes a linear, unsubstituted $C_6$-$C_{12}$ alkyl group, preferably $C_8$-$C_{10}$ alkyl group, most preferably Ca alkyl group. In various further embodiments, preference is given to compounds D) in which, according to formula (III), $R^2$ denotes a hydrogen atom. In some embodiments, particular preference is given to compounds D) in which, according to formula (III), $R^1$ denotes a linear, unsubstituted $C_8$ alkyl group and $R^2$ represents a hydrogen atom.

Compounds E) which, are also suitable as low-molecular gelling agents are, in various embodiments, compounds which correspond to the following formula (IV):

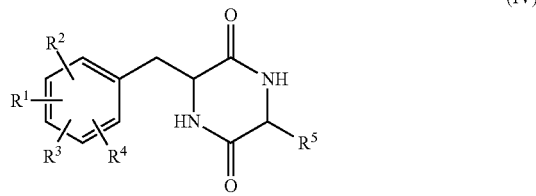

wherein, in the compounds of formula (IV), $R^1$, $R^2$, $R^3$ and $R^4$ represent, independently of one another, a hydrogen atom, a hydroxyl group, a $(C_1-C_6)$alkyl group, a $(C_2-C_6)$ alkenyl group, a $(C_2-C_6)$) acyl group, a $(C_2-C_6)$ acyloxy group, a $(C_1-C_6)$ alkoxy group, an amino group, a $(C_2-C_6)$ acylamino group, a $(C_1-C_6)$ alkylaminocarbonyl group, an aryl group, an aroyl group, an aroyloxy group, an aryloxy group, an aryl-$(C_1-C_4)$ alkyloxy group, an aryl-$(C_1-C_3)$ alkyl group, a heteroaryl group, a heteroaryl-$(C_1-C_3)$ alkyl group, a $(C_1-C_4)$ hydroxyalkyl group, a $(C_1-C_4)$ aminoalkyl group, or a carboxy-$(C_1-C_3)$ alkyl group, wherein at least two of the groups $R^1$ to $R^4$ can form, together with the remainder of the molecule, a 5-membered or 6-membered ring, and $R^5$ represents a hydrogen atom, a linear $(C_1$ to $C_6)$ alkyl group, a branched $(C_3$ to $C_{10})$ alkyl group, a $(C_3$ to $C_6)$ cycloalkyl group, a $(C_2-C_6)$ alkenyl group, a $(C_2-C_6)$ alkynyl group, a $(C_1-C_4)$ hydroxyalkyl group, a $(C_1-C_4)$ alkoxy-$(C_1-C_4)$ alkyl group, a $(C_1-C_4)$ acyloxy-$(C_1-C_4)$ alkyl group, an aryloxy-$(C_1-C_4)$ alkyl group, an O-(aryl-$(C_1-C_4)$ alkyl)oxy-$(C_1-C_4)$ alkyl group, a $(C_1-C_4)$ alkylsulfanyl-$(C_1-C_4)$ alkyl group, an aryl group, an aryl-$(C_1-C_3)$ alkyl group, a heteroaryl group, a heteroaryl-$(C_1-C_3)$ alkyl group, a $(C_1-C_4)$ hydroxyalkyl group, a $(C_1-C_4)$ aminoalkyl group, an N—$(C_1-C_4)$alkylamino-$(C_1-C_4)$ alkyl group, an N,N—$(C_1-C_4)$ dialkylamino-$(C_1-C_4)$ alkyl group, an N—$(C_2-C_8)$ acylamino-$(C_1-C_4)$ alkyl group, an N—$(C_2-C_8)$ acyl-N—$(C_1-C_4)$ alkylamino-$(C_1-C_4)$ alkyl group, an N—$(C_2-C_8)$ aroyl-N—$(C_1-C_4)$ alkylamino-$(C_1-C_4)$ alkyl group, an N,N—$(C_2-C_8)$ diacylamino-$(C_1-C_4)$ alkyl group, an N-(aryl-$(C_1-C_4)$ alkyl)amino-$(C_1-C_4)$ alkyl group, an N,N-di(aryl-$(C_1-C_4)$ alkyl)amino-$(C_1-C_4)$ alkyl group, a $(C_1-C_4)$ carboxyalkyl group, a $(C_1-C_4)$ alkoxycarbonyl-$(C_1-C_3)$ alkyl group, a $(C_1-C_4)$ acyloxy-$(C_1-C_3)$ alkyl group, a guanidino-$(C_1-C_3)$ alkyl group, an aminocarbonyl$(C_1-C_4)$ alkyl group, an N—$(C_1-C_4)$ alkylaminocarbonyl-$(C_1-C_4)$ alkyl group, an N,N-di($(C_1-C_4)$ alkyl)aminocarbonyl-$(C_1-C_4)$ alkyl group, an N—$(C_2-C_8)$ acylaminocarbonyl-$(C_1-C_4)$ alkyl group, an N,N—$(C_2-C_8)$ diacylaminocarbonyl-$(C_1-C_4)$ alkyl group, an N—$(C_2-C_8)$ acyl-N—$(C_1-C_4)$ alkylaminocarbonyl-$(C_1-C_4)$ alkyl group, an N-(aryl-$(C_1-C_4)$ alkyl)aminocarbonyl-$(C_1-C_4)$ alkyl group, an N-(aryl-$(C_1-C_4)$ alkyl)-N—$(C_1-C_6)$ alkylaminocarbonyl-$(C_1-C_4)$ alkyl group or an N,N-di(aryl-$(C_1-C_4)$ alkyl)aminocarbonyl-$(C_1-C_4)$ alkyl group.

All groups defined according to formula (IV) which contain an aromatic aryl or heteroaryl group are unsubstituted or substituted. Such a substitution is understood by a person skilled in the art to mean the replacement of at least one hydrogen atom directly bonded to the aromatic ring system by at least one group other than a hydrogen atom. A group other than a hydrogen atom is preferably understood to mean all groups other than a hydrogen atom which are defined under the definitions of $R^5$ and $R^1$ according to formula (I), in particular a hydroxyl group, an amino group, a $(C_1-C_6)$ alkyl group, a $(C_2-C_6)$ alkenyl group, a $(C_2-C_6)$) acyl group, a $(C_2-C_6)$ acyloxy group, a $(C_1-C_6)$ alkoxy group, an amino group, a $(C_2-C_6)$ acylamino group, a $(C_1-C_6)$ alkylaminocarbonyl group, an aryl group, an aroyl group, an aroyloxy group, an aryloxy group, an aryl-$(C_1-C_4)$ alkyloxy group, an aryl-$(C_1-C_3)$ alkyl group, a heteroaryl group, a heteroaryl-$(C_1-C_3)$ alkyl group, a $(C_1-C_4)$ hydroxyalkyl group, a $(C_1-C_4)$ aminoalkyl group.

In conjunction with compounds according to formula (IV), an alkyl group (or an alkyl structure fragment of a more complex group) is understood to mean a group selected from a linear alkyl group, a branched alkyl group and a cyclic alkyl group (also: cycloalkyl group). In this context, preferred linear or branched $(C_1-C_6)$ alkyl groups are selected from methyl, ethyl, n-propyl, isopropyl, n-butyl, sec-butyl, isobutyl, tert-butyl, n-pentyl, neo-pentyl, n-hexyl. In this context, preferred branched $(C_3-C_{10})$ alkyl groups are selected from iso-propyl, sec-butyl, iso-butyl, tert-butyl, neo-pentyl, iso-octyl, 2-ethylhexyl, 2-ethylheptyl. In this context, preferred cyclic alkyl groups ($(C_3-C_6)$ cycloalkyl groups) are selected from cyclopentyl and cyclohexyl.

In this context, preferred $(C_2-C_6)$ alkenyl groups are selected from vinyl, allyl, 2-butenyl.

In this context, preferred $(C_2-C_6)$ alkynyl groups are selected from ethynyl, propargyl, but-2-ynyl, hex-3-ynyl.

In this context, preferred $(C_2-C_6)$ acyl groups are selected from acetyl, propanoyl, butanoyl, pentanoyl, hexanoyl, in particular acetyl.

In this context, preferred $(C_2-C_6)$ acyloxy groups are selected from acetyloxy, propanoyloxy, butanoyloxy, pentanoyloxy and hexanoyloxy, in particular acetyloxy.

In conjunction with compounds according to formula (IV), an alkoxyl group is understood to mean an alkyl group binding via an oxygen atom, selected from a linear alkyl group, a branched alkyl group or a cyclic alkyl group (also: cycloalkyl group). In this context, preferred $(C_1-C_6)$ alkoxy groups are selected from methoxy, ethoxy, n-propoxy, iso-propoxy, n-butoxy, sec-butoxy, iso-butoxy and tert-butoxy.

Preferred $(C_2-C_6)$ acylamino groups in this context are acetylamino, propanoylamino, butanoylamino, pentanoylamino and hexanoylamino, in particular acetylamino.

Preferred $(C_2-C_6)$ alkylaminocarbonyl groups in this context are ethylaminocarbonyl (i.e. $CH_3CH_2$—NH—C (=O)—), propylaminocarbonyl, butanoylamino, pentanoylamino and hexanoylamino, in particular acetylamino.

Preferred aryl groups in this context are phenyl, naphthyl, anthracenyl, these being substituted or unsubstituted.

In the context of formula (IV), aroyl groups denote arene carbonyl groups in which a carbonyl group binds directly to the aromatic ring system. Preferred aroyl groups in this context are benzoyl, naphthoyl and anthracenoyl, these being substituted or unsubstituted.

In the context of formula (IV), aroyloxy groups denote aroyl groups which bind to an oxygen atom that additionally binds to the carbonyl radical. In this context, preferred aroyloxy groups are selected from benzoyloxy, naphthoyloxy and anthracenoyloxy, these being substituted or unsubstituted.

A preferred aryloxy group is the phenoxy group or the naphthoxy group, these being substituted or unsubstituted.

Preferred aryl-$(C_1-C_3)$ alkyl groups are selected from benzyl, 2-phenylethyl, naphthylmethyl, 2-naphthylethyl, which are substituted or unsubstituted.

Preferred heteroaryl groups are pyridyl, pyrimidinyl, imidazolyl, indolyl, furyl, thiophenyl, 1,3,5-triazolyl.

Preferred heteroaryl-$(C_1-C_3)$ alkyl groups are selected from furfuryl, 2-indol-3-ylethyl, indol-3-ylmethyl, pyridylmethyl, these being substituted or unsubstituted.

In some embodiments, particular preference is given to 2,5-diketopiperazine compounds E) of formula (IV) in which $R^5$ is a $(C_1-C_4)$ hydrocarbon group substituted with an aromatic group, in particular a group of the following formulas (IV) or (VI), as defined below.

In some embodiments, preference is also given to 2,5-diketopiperazine compounds E) according to formula (IV) in which $R^3$ and $R^4$ according to formula (IV) represent a hydrogen atom. In some embodiments, particular preference is given to compounds E) in which $R^2$, $R^3$ and $R^4$ of the formula (I) represent a hydrogen atom. Therefore, in some embodiments, a compound E) corresponds in particular to a 2,5-diketopiperazine compound according to formula (IV-a):

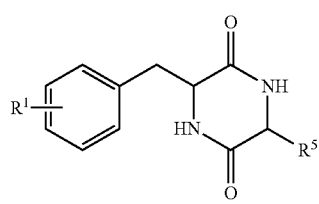

(IV-a)

wherein, in formula (IV-a), $R^1$ and $R^5$ are as defined under formula (IV).

According to some embodiments, the group $R^1$ according to formula (I) and according to formula (Ia) binds in the para position of the phenyl ring. Preference is therefore given in some embodiments to compounds E) which contain at least one 2,5-diketopiperazine compound according to formula (I-b):

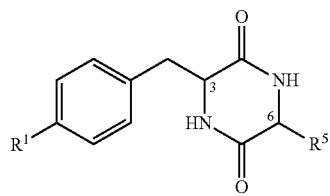

(IV-b)

wherein, according to formula (IV-b), $R^1$ and $R^5$ are as defined above under formula (IV). The numbers 3 and 6 positioned on the ring atoms in formula (IV-b) only mark positions 3 and 6 of the diketopiperazine ring, as they are generally used for naming all 2,5-diketopiperazines.

Particularly preferred compounds E) of formula (IV-b) have the following groups:

| $R^1$ | $R^5$ |
| --- | --- |
| Hydrogen atom | 2-Carboxyethyl |
| Hydrogen atom | p-Hydroxybenzyl |
| Hydroxy group | p-Hydroxybenzyl |

-continued

| $R^1$ | $R^5$ |
| --- | --- |
| Hydrogen atom | 2-(Benzyloxycarbonyl)ethyl |
| Hydrogen atom | 4-Imidazolylmethyl |
| Hydrogen atom | Methyl |
| Benzyloxy | p-(Benzyloxy)-benzyl |

The following compounds E) are also preferred:
3-benzyl-6-iso-propyl-2,5-diketo-[3S, 6S]-piperazine,
3-benzyl-6-(4-aminobutyl)-2,5-diketo[3R, 6R]-piperazine
3,6-di(benzyl)-2,5-diketo[3S, 6S]-piperazine.

The following definitions of preferred groups $R^1$ to $R^5$ apply to compounds of formula (IV), but also to compounds of formulas (IV-a) and (IV-b), with the proviso that for formulas (IV-a) and (IV-b) the groups $R^2$, $R^3$ and $R^4$ must represent a hydrogen atom.

According to some embodiments, it is preferred that in compounds E) of formula (IV), the groups $R^1$, $R^2$, $R^3$ and $R^4$, each independently of one another, represent a hydrogen atom, a hydroxyl group, a methyl group, an ethyl group, an iso-propyl group, an n-propyl group, an n-butyl group, an iso-butyl group, a sec-butyl group, a tert-butyl group, a phenyl group, a benzyl group, a methoxy group, a $(C_2-C_6)$-acyloxy group, an aryloxy group, a tosyloxy group, a triflyloxy group, a benzyloxy group or a benzoyloxy group.

In further embodiments, compounds E) of formula (IV) are also particularly suitable in which $R^5$ denotes a hydrogen atom, a methyl group, an isopropyl group, an iso-butyl group, a tert-butyl group, a 2-(methylsulfanyl)ethyl group, a hydroxymethyl group, a $(C_1-C_3)$alkoxymethyl group, a benzyloxymethyl group, an acetyloxymethyl group, a benzoyloxymethyl group, a tosyloxymethyl group, a 1-hydroxyethyl group, a 1-(($C_1-C_3)$alkoxy)ethyl group, a 1-(acetyloxy) ethyl group, a 1-(benzoyloxy)ethyl group, a 1-(tosyloxy) ethyl group, a mercaptomethyl group, a $(C_1-C_3)$-alkylsulfanylmethyl group, an acetylsulfanylmethyl group, a benzoylsulfanylmethyl group, a tosylsulfanylmethyl group, a group according to formula (VI),

(VI)

in which R' represents a hydrogen atom, a $(C_1-C_4)$ alkyl group, a $(C_2-C_4)$ alkenyl group, an aryl group or an aryl-$(C_1-C_4)$-alkyl group,
a group according to formula (VII),

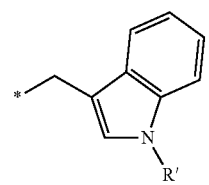

(VII)

in which R' represents a hydrogen atom, a $(C_1-C_4)$ alkyl group, a $(C_2-C_4)$ alkenyl group, an aryl group or an aryl-$(C_1-C_4)$-alkyl group, a group according to formula (VIII),

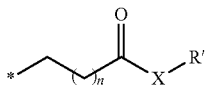
(VIII)

in which n represents 0 or 1, X represents an oxygen atom or a —NH— group and R" represents a hydrogen atom, a ($C_1$-$C_4$) alkyl group, a ($C_2$-$C_4$) alkenyl group, an aryl group or an aryl-($C_1$-$C_4$)-alkyl group, a group according to formula (IX),

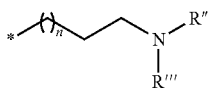
(IX)

in which n represents 1 or 2 and R" and R'" represent, independently of one another, a hydrogen atom, a ($C_1$-$C_4$) alkyl group, ($C_2$-$C_6$) acyl group, a benzoyl group, an aryl-($C_1$-$C_4$)-alkyl group, an aminoiminomethyl group or a tosyl group, a group according to formula (X),

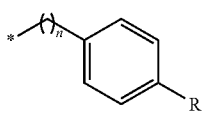
(X)

in which n represents 0 or 1 and R represents a hydrogen atom, a hydroxyl group, a ($C_1$-$C_4$) alkyl group, a ($C_1$-$C_4$) alkoxy group, an N—($C_1$-$C_4$)-alkylamino group, an aryl-($C_1$-$C_4$)-alkyl group, an acetyloxy group, a benzoyloxy group, a triflyloxy group or a tosyloxy group.

According to some embodiments, it is preferable for R' according to formula (VI) to represent a hydrogen atom, a methyl group, an ethyl group, an isopropyl group, an n-propyl group, an allyl group, a benzyl group or a phenyl group.

According to some embodiments, it is preferable for R' according to formula (VII) to represent a hydrogen atom, a methyl group, an ethyl group, an isopropyl group, a benzyl group, a benzoyloxy group or a phenyl group.

According to some embodiments, it is preferable for R' according to formula (VIII) to represent a hydrogen atom, a methyl group, an ethyl group, an isopropyl group, a benzyl group, a benzoyloxy group or a phenyl group.

According to some embodiments, it is preferable for R" and R'" according to formula (IX) to represent, independently of one another, a hydrogen atom, a methyl group, an ethyl group, an n-propyl group, an isopropyl group, a benzyl group, a benzoyl group, an acetyl group, an aminoiminomethyl group or a tosyl group.

According to some embodiments, it is preferable for R according to formula (X) to denote a hydrogen atom, a hydroxyl group, a methyl group, an ethyl group, an n-propyl group, an isopropyl group, a tert-butyl group, a phenyl group, a methoxy group, an acetyloxy group, a tosyloxy group, a triflyloxy group, a benzyloxy group or a benzoyloxy group.

When selecting the above-mentioned preferred groups $R^1$ to $R^5$, it is in turn preferred if, according to formula (IV) and according to formulas (IV-a) and (IV-b), the group $R^1$ binds in the para-position of the phenyl ring.

The 2,5-diketopiperazine compounds of formula (IV) have centers of chirality at least on the carbon atoms in positions 3 and 6 of the 2,5-diketopiperazine ring. The numbering of ring positions 3 and 6 was illustrated by way of example in formula (IV-b). The 2,5-diketopiperazine compound E) of formula (IV) is preferably, based on the stereochemistry of the carbon atoms at the 3 and 6 position of the 2,5-diketopiperazine ring, the configuration isomer 3S,6S, 3R,6S, 3S,6R, 3R,6R, or mixtures thereof, particularly preferably 3S,6S.

In specific embodiments, a compound E) according to formula (IV) is selected in particular from the group consisting of: 3-benzyl-6-carboxyethyl-2,5-diketopiperazine (also: 3-(5-benzyl-3,6-dioxopiperazine-2-yl)propanoic acid), 3-benzyl-6-carboxymethyl-2,5-diketopiperazine, 3-benzyl-6-(p-hydroxybenzyl)-2,5-diketopiperazine, 3-benzyl-6-iso-propyl-2,5-diketopiperazine, 3-benzyl-6-(4-aminobutyl)-2,5-diketopiperazine, 3,6-di(benzyl)-2,5-diketopiperazine, 3,6-di(4-hydroxybenzyl)-2,5-diketopiperazine, 3,6-di(4-(benzyloxy)benzyl)-2,5-diketopiperazine, 3-benzyl-6-(4-imidazolyl)methyl-2,5-diketopiperazine, 3-benzyl-6-methyl-2,5-diketopiperazine, 3-benzyl-6-(2-(benzyloxycarbonyl)ethyl)-2,5-diketopiperazine (also: 3-(5-benzyl-3,6-dioxopiperazin-2-yl)propanoic acid benzyl ester) and mixtures thereof. In turn, compounds having the aforementioned configuration isomers are preferably suitable for selection.

In some other embodiments, a compound E) according to formula (IV) is selected in particular from the group consisting of: 3,6-bis(4-hydroxybenzyl)piperazine-2,5-dione, 3-benzyl-6-isopropylpiperazine-2,5-dione, 3,6-bis(4-(benzyloxy)benzyl)piperazine-2,5-dione, 3-benzyl-piperazine-2,5-dione, 3-benzyl-6-carboxymethylpiperazine-2,5-dione and mixtures of the above-mentioned compounds. In turn, compounds having the aforementioned configuration isomers are preferably suitable for selection; in each case, the S,S configuration is particularly preferred.

In some other embodiments, a compound E) according to formula (IV) is particularly preferably selected from the group consisting of: (3S,6S)-3,6-bis(4-hydroxybenzyl)piperazine-2,5-dione, (3R,6R)-3,6-bis(4-hydroxybenzyl)piperazine-2,5-dione, (3S,6R)-3,6-bis(4-hydroxybenzyl)piperazine-2,5-dione, (3R,6S)-3,6-bis(4-hydroxybenzyl)piperazine-2,5-dione or mixtures thereof in the surfactant compositions as component (ii). (3S,6S)-3,6-bis(4-hydroxybenzyl)piperazine-2,5-dione is in turn most preferred.

2,5-diketopiperazine compounds that can be contained in the compositions can be prepared using known synthesis methods (cf. Suzuki et al., Chem. Pharm. Bull. 1981, 29 (1), 233-237).

Compounds F) from the group of glucosamines are also suitable as low-molecular gelling agents.

In some embodiments, particularly suitable glucosamine compounds F) correspond to the following formula (V):

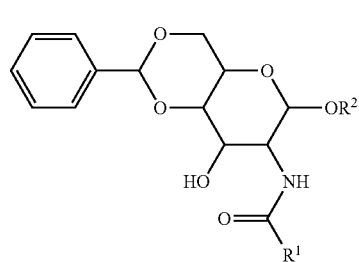
(V)

wherein, according to formula (V),

R¹ is a group containing a vinyl group, preferably a group containing a (meth)acrylate group; R² is hydrogen or a substituted or unsubstituted $C_{1-10}$ hydrocarbon group, preferably hydrogen or a substituted or unsubstituted $C_{1-10}$ alkyl group, more preferably a hydrogen, ethyl or methyl.

According to some embodiments, R¹ in formula (V) denotes an optionally halogen-substituted $C_{1-11}$ alkyl group, which is preferably selected from the group consisting of pentyl, hexyl, heptyl, octyl, 4-chlorobutyl and 5-bromopentyl; an optionally substituted phenyl, naphthyl or anthracenyl radical; a $C_{2-6}$ alkenyl radical, preferably selected from the group consisting of vinyl, allyl and 2-butenyl; or a $C_{2-11}$ alkynyl radical, preferably selected from the group consisting of 4-pentynyl, 5-hexynyl, 6-heptynyl and 10-undecynyl; all of which are substituted with a vinyl group or a (meth)acrylate group.

In preferred embodiments, compound F) has the formula (Va):

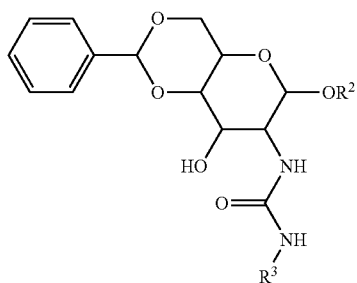

(Va)

wherein, in the compounds according to formula (Va),
R³ is a group containing a vinyl group, preferably a group containing a (meth)acrylate group; and
R² is hydrogen or a substituted or unsubstituted $C_{1-10}$ hydrocarbon group, preferably hydrogen or a substituted or unsubstituted $C_{1-10}$ alkyl group, more preferably a hydrogen, ethyl or methyl.

In further embodiments, in compounds of formula (Va), R³ is an optionally halogen-substituted $C_{1-8}$ alkyl group, preferably selected from the group consisting of pentyl, hexyl, heptyl, 2-chloroethyl and 2-bromoethyl; a substituted or unsubstituted phenyl, naphthyl or anthracenyl radical; a $C_{2-7}$ alkynyl radical preferably selected from 4-pentynyl and 5-hexynyl; a cyclopentyl group; a cyclohexyl group or a $C_{1-4}$ hydroxyalkyl group, all groups being substituted with a vinyl group or a (meth)acrylate group.

In yet other embodiments, the compounds F) have the formula (Vb):

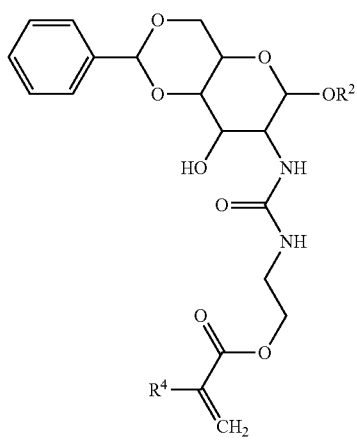

(Vb)

wherein, in the compounds according to formula (Vb),
R⁴ is hydrogen or a substituted or unsubstituted $C_{1-10}$ hydrocarbon group, preferably hydrogen or a substituted or unsubstituted $C_{1-10}$ alkyl group, more preferably a hydrogen, ethyl or methyl; and
R² is hydrogen or a substituted or unsubstituted $C_{1-10}$ hydrocarbon group, preferably hydrogen or a substituted or unsubstituted $C_{1-10}$ alkyl group, more preferably a hydrogen, ethyl or methyl.

If the groups of the above formulas (V) to (Vb) are substituted, the substituent is preferably selected from —F, —Cl, —Br; =O, —OH, —NH₂, —$C_{1-5}$ alkyl, and/or —NO₂. The respective groups can be substituted once or multiple times.

A particularly preferred glucosamine derivative F) is:

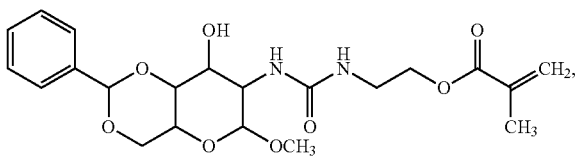 [SMILES: C=C(C)C(=O)OCCNC(=O)NC1C(OC)OC2COC(c3ccccc3)OC2C1O]

in particular

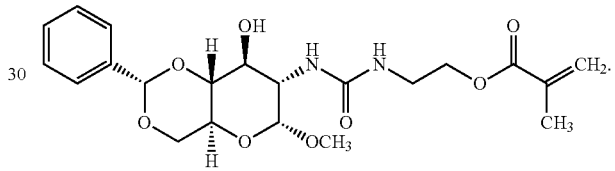

Suitable compounds from the group of glucosamines, as defined above, are commercially available. In addition, they may be synthesized, for example, as described by N. Goyal et al. in Tetrahedron 2010, 66, issue 32, pages 5962-5971.

In some embodiments, the at least one low-molecular gelling agent, as defined above, is preferably selected from the group consisting of 12-hydroxystearic acid (12-HSA) and dibenzylidene sorbitol (DBS) and a diketopiperazine of formula (IV-b) where R¹=H and R⁵=4-imidazolylmethyl, which corresponds to the cyclic dipeptide L-Phe-L-His.

In specific embodiments, the at least one low-molecular gelling agent, as defined above, is contained in the perfume oil storage composition preferably in an amount of approximately 0.1 to approximately 20 wt. %, preferably in an amount of 0.5 to 10 wt. %, for example in an amount of 0.5; 0.6; 0.7; 0.8; 0.9; 1.0; 1.1; 1.5; 2.0; 2.5; 3; 4; 5; 6; 7; 8; 9; or 10 wt. %, in each case based on the total weight of the composition or based on the total weight of the dispersed/oil phase. The gelling agent serves to form stable droplets or particles that enclose the perfume oil in the form of a matrix or a capsule shell. The gelling agent can be used in liquid form to form the dispersed phase, so that in a first step an oil-in-water emulsion is formed, the oil phase including the gelling agent and the perfume oil. Upon cooling to room temperature or typically temperatures below 50° C., for example in the range of 40° C. or less, 30° C. or less, the gelling agent can solidify and form a solid or gel, which then encloses the perfume oil in the form of solid or gel particles. In general, the at least one low-molecular gelling agent is present in the compositions as a dispersed phase, i.e. preferably in the form of particles dispersed in the aqueous phase, which additionally also comprise the at least one perfume oil. The corresponding particles formed are defined in more detail below.

Another component of the perfume oil storage composition is a perfume oil.

As fragrant substances, odorants or perfume oils, all substances and mixtures known for this purpose can be used. The terms "odorant(s)," "fragrant substances" and "perfume oil(s)" are used synonymously. The terms refer, in particular, to all substances or mixtures thereof that are perceived by humans and animals as having a smell, in particular perceived by humans as having a pleasant smell.

Perfumes, perfume oils, or perfume oil constituents may be used as fragrant substance components. Perfume oils or fragrant substances may be individual odorant compounds, such as synthetic products of the ester, ether, aldehyde, ketone, alcohol, and hydrocarbon types.

Fragrance compounds of the aldehyde type are, for example, adoxal (2,6,10-trimethyl-9-undecenal), anisaldehyde (4-methoxybenzaldehyde), cymene (3-(4-isopropyl-phenyl)-2-methylpropanal), ethylvanillin, Florhydral (3-(3-isopropylphenyl)butanal), helional (3-(3,4-methylenedioxyphenyl)-2-methylpropanal), heliotropin, hydroxycitronellal, lauraldehyde, Lyral (3- and 4-(4-hydroxy-4-methylpentyl)-3-cyclohexene-1-carboxaldehyde), methylnonylacetaldehyde, Lilial (3-(4-tert-butylphenyl)-2-methyl-propanal), phenylacetaldehyde, undecylenealdehyde, vanillin, 2,6,10-trimethyl-9-undecenal, 3-dodecen-1-al, alpha-n-amylcinnamaldehyde, melonal (2,6-dimethyl-5-heptenal), 2,4-di-methyl-3-cyclohexene-1-carboxaldehyde (Triplal), 4-methoxybenzaldehyde, benzaldehyde, 3-(4-tert-butylphenyl)-propanal, 2-methyl-3-(para-methoxyphenyl) propanal, 2-methyl-4-(2,6,6-timethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]-decylidene-8)-butanal, octahydro-4,7-methane-1H-indenecarboxaldehyde, 3-ethoxy-4-hydroxybenzaldehyde, para-ethyl-alpha,alpha-dimethylhydrocinnamaldehyde, alpha-methyl-3,4-(methylenedioxy)-hydrocinnamaldehyde, 3,4-methylenedioxybenzaldehyde, alpha-n-hexylcinnamaldehyde, m-cymene-7-carboxaldehyde, alpha-methylphenylacetaldehyde, 7-hydroxy-3,7-dimethyloctanal, undecenal, 2,4,6-trimethyl-3-cyclohexene-1-carboxaldehyde, 4-(3)(4-methyl-3-pentenyl)-3-cyclohexene carboxaldehyde, 1-dodecanal, 2,4-dimethylcyclohexene-3-carboxaldehyde, 4-(4-hydroxy-4-methylpentyl)-3-cyclohexene-1-carboxaldehyde, 7-methoxy-3,7-dimethyloctan-1-al, 2-methyl-undecanal, 2-methyldecanal, 1-nonanal, 1-octanal, 2,6,10-trimethyl-5,9-undecadienal, 2-methyl-3-(4-tert-butyl)propanal, dihydrocinnamaldehyde, 1-methyl-4-(4-methyl-3-pentenyl)-3-cyclohexene-1-carboxaldehyde, 5- or 6-methoxyhexahydro-4,7-methanindan-1- or 2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyl-octanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexenecarboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanindan-1-carboxaldehyde, 2-methyloctanal, alpha-methyl-4-(1-methylethyl)benzeneacetaldehyde, 6,6-dimethyl-2-norpinene-2-propionaldehyde, para-methylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methylnonylacetaldehyde, hexanal and trans-2-hexenal.

Fragrance compounds of the ketone type are, for example, methyl-beta-naphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alpha-damascone, beta-damascone, delta-damascone, iso-damascone, damascenone, methyldihydrojasmonate, menthone, carvone, camphor, Koavone (3,4,5,6,6-pentamethylhept-3-en-2-one), fenchone, alpha-ionone, beta-ionone, gamma-methyl-ionone, fleuramone (2-heptylcyclopentanone), dihydrojasmone, cis-jasmone, Iso E Super (1-(1,2,3,4,5,6J,8-octahydro-2,3,8,8-tetramethyl-2-naphthalenyl)-ethan-1-one (and isomers)), methyl cedrenyl ketone, acetophenone, methyl acetophenone, para-methoxy acetophenone, methyl beta-naphthyl ketone, benzyl acetone, benzophenone, para-hydroxyphenyl butanone, celery ketone (3-methyl-5-propyl-2-cyclohexenone), 6-isopropyldecahydro-2-naphthone, dimethyloctenone, frescomenthe (2-butan-2-yl-cyclohexan-1-one), 4-(1-ethoxyvinyl)-3,3,5,5-tetramethylcyclohexanone, methylheptenone, 2-(2-(4-methyl-3-cyclohexen-1-yl)propyl)cyclopentanone, 1-(p-menthen-6(2)-yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)-indanone, 4-damascol, dulcinyl (4-(1,3-benzodioxol-5-yl)butan-2-one), hexalone (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonylketone, methylcyclocitrone, methyl lavender ketone, orivone (4-tert-amyl-cyclohexanone), 4-tert-butylcyclohexanone, delphone (2-pentyl-cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyl-oct-6-en-3-one and tetramerane (6,10-dimethylundecen-2-one).

Fragrance compounds of the alcohol type are, for example, 10-undecen-1-ol, 2,6-dimethylheptan-2-ol, 2-methylbutanol, 2-methylpentanol, 2-phenoxyethanol, 2-phenylpropanol, 2-tert-butycyclohexanol, 3,5,5-trimethyl-cyclohexanol, 3-hexanol, 3-methyl-5-phenyl-pentanol, 3-octanol, 3-phenyl-propanol, 4-heptenol, 4-isopropylcyclohexanol, 4-tert-butycyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, di-hydromyrcenol, dimethylbenzylcarbinol, dimethylheptanol, dimethyloctanol, ethylsalicylate, ethylvanillin, eugenol, farnesol, geraniol, heptanol, hexylsalicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylate, tetrahydrogeraniol, tetrahydrolinalool, thymol, trans-2-cis-6-nonadienol, trans-2-nonen-1-ol, trans-2-octenol, undecanol, vanillin, champiniol, hexenol and cinnamyl alcohol.

Fragrance compounds of the ester type are e.g. benzyl acetate, phenoxyethyl isobutyrate, p-tert-butylcyclohexyl acetate, linalyl acetate, dimethylbenzylcarbinyl acetate (DMBCA), phenylethyl acetate, benzyl acetate, ethylmethylphenyl glycinate, allylcyclohexyl propionate, styrallyl propionate, benzyl salicylate, cyclohexyl salicylate, floramate, melusate, and jasmacyclate.

Ethers include, for example, benzyl ethyl ether and Ambroxan. Hydrocarbons mainly include terpenes such as limonene and pinene.

Preferably, mixtures of different fragrant substances are used, which together produce an appealing fragrance note. Such a mixture of fragrant substances may also be referred to as perfume or perfume oil. Perfume oils of this kind may also contain natural fragrant substance mixtures, such as those obtainable from plant sources.

Fragrances of plant origin include essential oils such as angelica root oil, aniseed oil, arnica blossom oil, basil oil, bay oil, champaca blossom oil, citrus oil, abies alba oil, abies alba cone oil, elemi oil, eucalyptus oil, fennel oil, spruce needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, cananga oil, cardamom oil, cassia oil, pine needle oil, copaiba balsam oil, coriander oil, spearmint oil, caraway oil, cumin oil, labdanum oil, lavender oil, lemon grass oil, lime blossom oil, lime oil, mandarin oil, melissa oil, mint oil, musk seed oil, muscatel oil, myrrh oil, clove oil, neroli oil, niaouli oil, olibanum oil, orange blossom oil, orange peel oil, origanum oil, palmarosa oil, patchouli oil, balsam Peru oil, petitgrain oil, pepper oil, peppermint oil, allspice oil, pine oil, rose oil, rosemary oil, sage oil, sandalwood oil, celery oil, spike lavender oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil, and ambrettolide, Ambroxan, alpha-amylcinnamaldehyde, anethole, anisaldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptyne carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrole, jasmone, camphor, carvacrol, carvone, p-cresol methyl ether, coumarin, p-methoxyacetophenone, methyl n-amyl ketone, methylanthranilic acid methyl ester, p-methylacetophenone, methyl chavicol, p-methylquinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undecalactone, vanillin, veratraldehyde, cinnamaldehyde, cinnamyl alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal and mixtures thereof. Mixtures of said substances may also be used.

If it is to be perceptible, an odorant has to be volatile; the molar mass, in addition to the nature of the functional groups and the structure of the chemical compound, also plays an important role. Therefore, most odorants have molar masses of up to approximately 200 daltons, while molar masses of 300 daltons and above are something of an exception. Due to the differing volatility of odorants, the odor of a perfume or fragrant substance composed of multiple odorants varies over the course of vaporization, wherein the odor impressions are divided into "top note," "middle note or body" and "end note or dry out." Analogously to the description in the international patent publication WO 2016/200761 A2, the top, middle and end notes can be classified on the basis of their vapor pressure (determinable by means of the test methods described in WO 2016/200761) as follows:

Top note: vapor pressure at 25° C.: >0.0133 kPa
Middle note: vapor pressure at 25° C.: 0.0133 to 0.000133 kPa
End note: vapor pressure at 25° C.: <0.000133 kPa Examples of adherent odorants that can be used are essential oils such as angelica root oil, aniseed oil, arnica blossom oil, basil oil, bay oil, bergamot oil, champaca blossom oil, abies alba oil, abies alba cone oil, elemi oil, eucalyptus oil, fennel oil, spruce needle oil, galbanum oil, geranium oil, ginger grass oil, guaiac wood oil, gurjun balsam oil, helichrysum oil, ho oil, ginger oil, iris oil, cajeput oil, calamus oil, chamomile oil, camphor oil, cananga oil, cardamom oil, cassia oil, pine needle oil, copaiba balsam oil, coriander oil, spearmint oil, caraway oil, cumin oil, lavender oil, lemon grass oil, lime oil, mandarin oil, melissa oil, musk seed oil, myrrh oil, clove oil, neroli oil, niaouli oil, olibanum oil, orange oil, origanum oil, palmarosa oil, patchouli oil, balsam Peru oil, petitgrain oil, pepper oil, peppermint oil, allspice oil, pine oil, rose oil, rosemary oil, sandalwood oil, celery oil, spike lavender oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil, and cypress oil.

Higher-boiling or solid odorants of natural or synthetic origin include, for example: Ambrettolide, α-amylcinnamaldehyde, anethole, anisaldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerianate, borneol, bornyl acetate, α-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptyne carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrole, jasmone, camphor, carvacrol, carvone, p-cresol methyl ether, coumarin, p-methoxyacetophenone, methyl n-amyl ketone, methylanthranilic acid methyl ester, p-methylacetophenone, methylchavicol, p-methylquinoline, methyl-p-naphthyl ketone, methyl n-nonyl acetaldehyde, methyl n-nonyl ketone, muscone, β-naphthol ethyl ether, β-naphthol methyl ether, nerol, nitrobenzene, n-nonyl aldehyde, nonyl alcohol, n-octylaldehyde, p-oxyacetophenone, pentadecanolide, β-phenethyl alcohol, phenylacetaldehyde dimethyl acetal, phenylacetic acid, pulegone, safrole, salicylic acid isoamyl ester, salicylic acid methyl ester, salicylic acid hexyl ester, salicylic acid cyclohexyl ester, santalol, skatole, terpineol, thymene, thymol, γ-undecalactone, vanillin, veratraldehyde, cinnamaldehyde, cinnamyl alcohol, cinnamic acid, cinnamic acid ethyl ester and cinnamic acid benzyl ester.

More volatile odorants include in particular lower-boiling odorants of natural or synthetic origin, which may be used alone or in mixtures. Examples of more volatile odorants are alkyl isothiocyanates (alkyl mustard oils), butanedione, limonene, linalool, linayl acetate and propionate, menthol, menthone, methyl-n-heptenone, phellandrene, phenylacetaldehyde, terpinyl acetate, citral and citronellal.

Odorant compounds of the aldehyde type that can preferably be used are hydroxycitronellal (CAS 107-75-5), Helional (CAS 1205-17-0), citral (5392-40-5), bourgeonal (18127-01-0), Triplal (CAS 27939-60-2), Ligustral (CAS 68039-48-5), vertocitral (CAS 68039-49-6), Florhydral (CAS 125109-85-5), citronellal (CAS 106-23-0), citronellyloxyacetaldehyde (CAS 7492-67-3).

In addition to or as an alternative to the above-mentioned odorants, it is also possible to use the odorants described in WO 2016/200761 A2, in particular the odorants mentioned in Tables 1, 2 and 3, and the modulators listed in Tables 4a and 4b. The whole of this publication is incorporated herein by way of reference.

The at least one perfume oil which is part of the composition as component b) can also be present in the form of a perfume oil preparation and can comprise, for example, at least one further active substance in oil form. Suitable active substances in oil form in this context are those which are suitable for washing, cleaning, care and/or finishing purposes, in particular
  (a) textile care substances, such as preferably silicone oils, and/or
  (b) skin care substances, such as preferably vitamin E, natural oils and/or cosmetic oils.

Skin care active substances are all those active substances which give the skin a sensory and/or cosmetic advantage. Skin care active substances are preferably selected from the following substances:
  a) waxes such as carnauba, spermaceti, beeswax, lanolin and/or derivatives thereof and others
  b) hydrophobic plant extracts
  c) hydrocarbons such as squalene and/or squalane
  d) higher fatty acids, preferably those having at least 12 carbon atoms, for example lauric acid, stearic acid, behenic acid, myristic acid, palmitic acid, oleic acid, linoleic acid, linolenic acid, isostearic acid and/or polyunsaturated fatty acids and others
  e) higher fatty alcohols, preferably those having at least 12 carbon atoms, for example lauryl alcohol, cetyl alcohol, stearyl alcohol, oleyl alcohol, behenyl alcohol, cholesterol and/or 2-hexadecanol and others
  f) esters, preferably such as cetyloctanoate, lauryl lactate, myristyl lactate, cetyl lactate, isopropyl myristate, myristyl myristate, isopropyl palmitate, isopropyl adipate, butyl stearate, decyl oleate, cholesteryl isostearate, glycerol monostearate, glyceryl distearate, glycerol tristearate, alkyl lactate, alkyl citrate and/or alkyl tartrate and others
  g) lipids such as cholesterol, ceramides and/or sucrose esters and others
  h) vitamins such as vitamins A, C and E, vitamin alkyl esters, including vitamin C alkyl esters and others
  i) sunscreens
  j) phospholipids
  k) derivatives of alpha hydroxy acids
  l) germicides for cosmetic use, both synthetic such as salicylic acid and/or others and natural such as neem oil and/or others
  m) silicones
  n) natural oils, e.g., almond oil and mixtures of any of the components listed above.

In various embodiments, the at least one perfume oil is contained in the composition in an amount of approximately 1 to 50 wt. %, preferably in an amount of 3 to 35 wt. %, for example in an amount of 3; 3.1; 3.2; 3.3; 3.4; 3.5; 3.6; 3.7; 3.8; 3.9; 4; 4.5; 5; 6; 7; 8th; 9; 10; 11; 12; 13; 14; 15; 16; 17; 18; 19; 20; 21; 22; 23; 24; 25; 30; or 35 wt. %, in each case based on the total weight of the perfume oil storage composition.

The perfume oil storage composition, as described herein, is a dispersion, for example an oil-in-water emulsion. The term "oil-in-water emulsion" is also used herein to encompass dispersions of gel particles formed from the gelling agent and including perfume oil, in a continuous, aqueous phase. Dispersions of the gel particles described herein are therefore included under the term "emulsion." The dispersed phase comprises the at least one low-molecular gelling agent, as defined above, and the at least one perfume oil, as defined above. In various embodiments, the dispersed phase consists of solid or gel particles, with the gelling agent forming the particle matrix which encloses the perfume oil. The perfume oil can be present in the matrix material, which is formed by the gelling agent, in dispersed form, or it can be enclosed thereby in the form of a shell. In the latter case, the particles can have a core-shell morphology. In general, the matrix material, i.e. the gelling agent, can enclose the perfume oil, which can be present in the form of one or more droplets, with the gelling agent here forming a shell which encloses one or more cores of perfume oil. The particles are typically substantially spherical. Regardless of the type and shape of the particles, the gelling agent forms a matrix or shell that encloses the perfume oil and largely shields it from the continuous phase.

In various embodiments, the individual droplets/particles of the dispersed phase have an average diameter in the micron range, i.e. are microparticles. Such particles can have average diameters $d_{50}$ from approximately 1 μm to approximately 400 μm, preferably from approximately 1 μm to approximately 200 μm, for example from approximately 1; 1.5; 2; 2.5; 3; 3.5; 4; 4.5; 5; 5.5; 10; 10.5; 11; 15; 20; 25; 30; 35; 40; 45; 50; 70; 75; 80; 85; 90; 95; 100; 105; 110; 115; 120; 125; 150; 155; 160; 170; 180; 190; 195; 199; or 200 μm. The $d_{50}$ value can be 500 μm, for example, preferably in the range of 300-400 μm. In various embodiments, 90% of the particles have a diameter in the range of from 2 to 100 μm, for example 3 to 80 μm or 3 to 20 μm or 10 to 80 μm or 20 to 80 μm.

The $d_{50}$ value indicates the diameter which results when 50 wt. % of the droplets/particles have a smaller diameter and 50 wt. % of the droplets have a larger diameter than the $d_{50}$ value determined. The $d_{90}$ value of the droplet/particle size distribution is the value at which 90% of all droplets/particles are smaller and 10% of the particles are larger than this value.

The diameter of the droplets/particles can be determined using conventional methods. It can be determined, for example, using dynamic light scattering (DLS) or light diffraction, for example in accordance with DIN ISO 22412. It can also be determined by evaluating light microscopic or electron microscopic images of the droplets/particles of the emulsion.

A further constituent of the perfume oil storage composition is, in some embodiments, at least one additional ingredient selected from the group consisting of surfactants, thickeners, dyes and rheology modifiers.

Suitable surfactants which, according to some embodiments, can be part of the perfume oil storage composition are known in the prior art and include anionic surfactants, cationic surfactants, non-ionic surfactants, zwitterionic, amphoteric surfactants and mixtures thereof.

Suitable compounds from the class of anionic surfactants are those of formula (I)

In this formula (I), R represents a linear or branched, unsubstituted alkyl aryl group. X represents a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2-}$, and mixtures thereof.

"Alkyl aryl," as used herein in the context of surfactants, refers to organic groups that consist of an alkyl group and an aromatic group. Typical examples of groups of this kind include, but are not restricted to, alkylbenzene groups, such as benzyl, butylbenzene groups, nonylbenzene groups, decylbenzene groups, undecylbenzene groups, dodecylbenzene groups, tridecylbenzene groups and the like.

In various embodiments, surfactants of this kind are selected from linear or branched alkylbenzene sulfonates of the formula A-1:

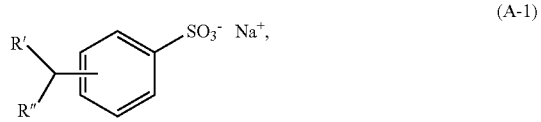

in which R' and R'' together contain 9 to 19, preferably 11 to 15, and in particular 11 to 13, C atoms. A very particularly preferred representative can be described by formula A-1a:

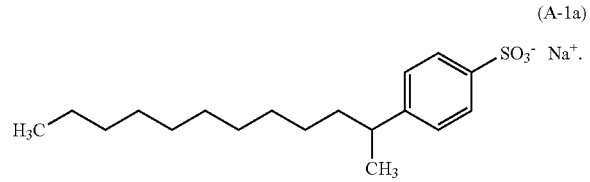

In various embodiments, the compound of formula (I) is preferably the sodium salt of a linear alkylbenzene sulfonate.

Preferred anionic surfactants are those of the formula (II):

In this formula (II), $R^1$ represents a linear or branched, substituted or unsubstituted alkyl group, preferably a linear, unsubstituted alkyl group, particularly preferably a fatty alcohol group. Preferred groups $R^1$ are selected from decyl, undecyl, dodecyl, tridecyl, tetradecyl, pentadecyl, hexadecyl, heptadecyl, octadecyl, nonadecyl and eicosyl groups and mixtures thereof, the representatives having an even number of C atoms being preferred. Particularly preferred groups $R^1$ are derived from $C_{12}$-$C_{18}$ fatty alcohols, for example from coconut fatty alcohol, tallow fatty alcohol, lauryl, myristyl, cetyl or stearyl alcohol, or from $C_{10}$-$C_{20}$ oxo alcohols. X represents a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2+}$, and mixtures thereof.

AO represents an ethylene oxide (EO) or propylene oxide (PO) group, preferably an ethylene oxide group. The index n represents an integer from 1 to 50, preferably from 1 to 20, and in particular from 2 to 10. Very particularly preferably, n represents the numbers 2, 3, 4, 5, 6, 7 or 8. X represents a monovalent cation or the n-th part of an n-valent cation, the alkali metal ions, including $Na^+$ or $K^+$, being preferred in this case, with $Na^+$ being most preferred. Further cations X+ may be selected from $NH_4^+$, ½ $Zn^{2+}$, ½ $Mg^{2+}$, ½ $Ca^{2+}$, ½ $Mn^{2+}$, and mixtures thereof.

Thus, in various embodiments, the compositions can contain at least one anionic surfactant selected from fatty alcohol ether sulfates of formula (II-1)

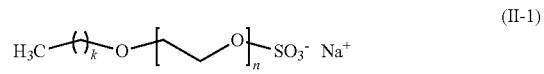

where k=11 to 19, and n=2, 3, 4, 5, 6, 7 or 8. Particularly preferred representatives are Na—$C_{12-14}$ fatty alcohol ether sulfates having 2 EO (k=11-13, n=2 in formula II-1).

Other anionic surfactants that can preferably be used are the alkyl sulfates of formula (III):

In this formula (III), $R^2$ represents a linear or branched, substituted or unsubstituted alkyl group, preferably a linear, unsubstituted alkyl group, particularly preferably a fatty alcohol group. Preferred groups $R^2$ are selected from decyl, undecyl, dodecyl, tridecyl, tetradecyl, pentadecyl, hexadecyl, heptadecyl, octadecyl, nonadecyl and eicosyl groups and mixtures thereof, the representatives having an even number of C atoms being preferred. Particularly preferred groups $R^2$ are derived from $C_{12}$-$C_{18}$ fatty alcohols, for example from coconut fatty alcohol, tallow fatty alcohol, lauryl, myristyl, cetyl or stearyl alcohol or from $C_{10}$-$C_{20}$ oxo alcohols. X represents a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2+}$, and mixtures thereof.

Suitable surfactants can be selected, for example, from fatty alcohol sulfates of formula (III-1)

where k=11 to 19. Very particularly preferred representatives are Na—$C_{12-14}$ fatty alcohol sulfates (k=11-13 in formula (III-1).

Other anionic surfactants that can be used are alkyl ester sulfonates, in particular those of formula (IV):

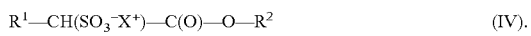

In this formula (IV), $R^1$ represents a linear or branched, substituted or unsubstituted alkyl group, preferably a linear, unsubstituted alkyl group. Preferred groups $R^1$ are selected from nonyl, decyl, undecyl, dodecyl, tridecyl, tetradecyl, pentadecyl, hexadecyl, heptadecyl, octadecyl, nonadecyl, eicosyl, heneicosyl groups and mixtures thereof, the representatives having an odd number of C atoms being preferred. Particularly preferred groups $R^1$—CH are derived from $C_{12}$-$C_{18}$ fatty acids, for example from lauryl, myristyl, cetyl or stearyl acid. $R^2$ represents a linear or branched, substituted or unsubstituted alkyl group, preferably a linear, unsubstituted alkyl group. Preferred groups $R^2$ are $C_{1-6}$ alkyl groups, in particular methyl (=methyl ester sulfonates). X represents a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2+}$, and mixtures thereof.

The secondary alkane sulfonates are also suitable as anionic surfactants. Said sulfonates have, for example, formula (V)

$$R^1CH(SO_3^-X^+)R^2 \quad (V)$$

wherein, in this formula (V), each of $R^1$ and $R^2$ is independently a linear or branched alkyl having 1 to 20 carbon atoms and, together with the carbon atom to which they are bonded, form a linear or branched alkyl, preferably having 10 to 30 carbon atoms, preferably having 10 to 20 carbon atoms, and $X^+$ is selected from the group $Na^+$, $K^+$, $NH_4^+$, ½ $Zn^{2+}$, ½ $Mg^{2+}$, ½ $Ca^{2+}$, ½ $Mn^{2+}$ and mixtures thereof, preferably $Na^+$.

In various preferred embodiments, the at least one secondary alkane sulfonate has the following formula (V-1)

$$H_3C-(CH_2)_n-CH(SO_3^-X^+)-(CH_2)_m-CH_3 \quad (V-1)$$

wherein, in this formula (V-1), m and n are each, independently of one another, an integer between 0 and 20. Preferably, m+n is an integer between 7 and 17, preferably 10 to 14, and $X^+$ is selected from the group $Na^+$, $K^+$, $NH_4+$, ½ $Zn^{2+}$, ½ $Mg^{2+}$, ½ $Ca^{2+}$, ½ $Mn^{2+}$ and mixtures thereof, preferably $Na^+$. In a particularly preferred embodiment, the at least one secondary alkane sulfonate is secondary $C_{14-17}$ sodium alkane sulfonate. A secondary $C_{14-17}$ sodium alkane sulfonate of this kind is marketed, for example, by Clariant under the trade name "Hostapur SAS60."

Fatty alcohol alkoxylates in particular are suitable as non-ionic surfactants. Suitable non-ionic surfactants have in particular the following formula:

$$R^3-O-(AO)_m-H \quad (VI),$$

wherein
$R^3$ represents a linear or branched, substituted or unsubstituted alkyl group,
AO represents an ethylene oxide (EO) or propylene oxide (PO) grouping,
m represents integers from 1 to 50.

In the aforementioned formula (VI), $R^3$ represents a linear or branched, substituted or unsubstituted alkyl group, preferably a linear, unsubstituted alkyl group, particularly preferably a fatty alcohol group. Preferred groups $R^2$ are selected from decyl, undecyl, dodecyl, tridecyl, tetradecyl, pentadecyl, hexadecyl, heptadecyl, octadecyl, nonadecyl and eicosyl groups and mixtures thereof, the representatives having an even number of C atoms being preferred. Particularly preferred groups $R^3$ are derived from $C_{12}$-$C_{18}$ fatty alcohols, for example from coconut fatty alcohol, tallow fatty alcohol, lauryl, myristyl, cetyl or stearyl alcohol or from $C_{10}$-$C_{20}$ oxo alcohols.

AO represents an ethylene oxide (EO) or propylene oxide (PO) group, preferably an ethylene oxide group. The index m represents an integer from 1 to 50, preferably from 1 to 20, and in particular from 2 to 10. Very particularly preferably, m represents the numbers 2, 3, 4, 5, 6, 7 or 8.

In summary, the fatty alcohol alkoxylates to be preferably used are compounds of the formula

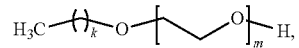

(VI-1)

where k=11 to 19, and m=2, 3, 4, 5, 6, 7 or 8. Very particularly preferred representatives are $C_{12-18}$ fatty alcohols with 7 EO (k=11-17, m=7 in formula (VI-1)).

Amine oxides, for example, are also suitable as non-ionic surfactants. In principle, all the amine oxides found in the prior art for this purpose, i.e. compounds that have the formula $R^1R^2R^3NO$, wherein each of $R^1$, $R^2$ and $R^3$, independently, is an optionally substituted, for example hydroxy-substituted, $C_1$-$C_{30}$ hydrocarbon chain, can be used in this respect. Amine oxides that are particularly preferably used are those in which $R^1$ is $C_{12}$-$C_{18}$ alkyl and $R^2$ and $R^3$ are, independently, each $C_1$-$C_4$ alkyl, in particular $C_{12}$-$C_{18}$ alkyl dimethyl amine oxides. Examples of representatives of suitable amine oxides are N-cocoalkyl-N,N-dimethyl amine oxide, N-tallow-alkyl-N,N-dihydroxyethyl amine oxide, myristyl-/cetyl dimethyl amine oxide or lauryl dimethyl amine oxide.

Other non-ionic surfactants that can be contained in the described compositions include, but are not limited to, alkyl glycosides, alkoxylated fatty acid alkyl esters, fatty acid alkanolamides, hydroxy mixed ethers, sorbitan fatty acid esters, polyhydroxy fatty acid amides and alkoxylated alcohols. Such surfactants are known in the prior art.

Suitable alkyl(poly)glycosides are, for example, those of the formula $R^2O$-$[G]_p$, in which $R^2$ is a branched alkyl having 12 to 16 carbon atoms, G is a sugar residue having 5 or 6 carbon atoms, in particular glucose, and the index p is 1 to 10.

Suitable amphoteric surfactants are, for example, betaines of the formula $(R^{iii})(R^{iv})(R^v)N^+CH_2COO^-$, in which $R^{iii}$ denotes an alkyl group, which is optionally interrupted by heteroatoms or heteroatom groups, having 8 to 25, preferably 10 to 21, carbon atoms, and $R^{iv}$ and $R^v$ denote identical or different alkyl groups having 1 to 3 carbon atoms, in particular $C_{10}$-$C_{18}$ alkyl dimethyl carboxymethyl betaine and $C_{11}$-$C_{17}$ alkyl amido propyl dimethyl carboxymethyl betaine.

Suitable cationic surfactants are, inter alia, the quaternary ammonium compounds of formula $(R^{vi})(R^{vii})(R^{viii})(R^{ix})N^+X^-$, in which $R^{vi}$ to $R^{ix}$ denote four identical or different, and in particular two long-chain and two short-chain, alkyl groups, and $X^-$ denotes an anion, in particular a halide ion, for example didecyl dimethyl ammonium chloride, alkyl benzyl didecyl ammonium chloride and the mixtures thereof. Further suitable cationic surfactants are the quaternary surface-active compounds, in particular having a sulfonium, phosphonium, iodonium or arsonium group, which are also known as antimicrobial active ingredients. By using quaternary surface-active compounds having an antimicrobial effect, the composition can be provided with an antimicrobial effect or the antimicrobial effect thereof that may already be present due to other ingredients can be improved.

In some embodiments, suitable surfactants in this context are selected in particular from the group consisting of sodium dodecyl sulfate (SDS), cetyltrimethylammonium bromide (CTAB), cetyltrimethylammonium chloride (CTAC), 1-acetoxy-2-stearoyloxyethane (AGS), sodium taurocholate, polysorbate 80 (Tween 80), and sorbitan monolaurate (Span 20). Corresponding surfactants are known in the prior art and are commercially available.

If the perfume oil storage composition comprises at least one surfactant as a further component, this is, in some embodiments, preferably contained in the perfume oil storage composition in an amount of 0 to 15 wt. %, preferably in an amount of 0.01 to 5 wt. %, for example in an amount of 0.01; 0.02; 0.03; 0.04; 0.05; 0.1; 0.2; 0.3; 0.4; 0.5; 1.0; 1.1; 1.2; 1.3; 1.4; 1.5; 2.0; 2.5; 3.0; 3.5; 4.0; 4.5; or 5.0 wt. %, based in each case on the total weight of the perfume oil storage composition.

Thickeners which are also suitable as an additional component of the perfume oil storage composition include all thickeners known in the prior art, in particular those which are suitable for washing, cleaning, care and/or finishing purposes.

Thickening agents that are suitable include, for example, but are not limited to, low-molecular gelling agents as defined above having a molar mass of <1000 g/mol, and gel-forming macromolecules having a molar mass of >1000 g/mol. Examples of groups of suitable thickeners include, but are not limited to, polysaccharides such as starch, glycosaminoglycans, e.g. hyaluronic acid, glucomannan or hydroxymethyl cellulose; phospholipids such as lecithin; and proteins and protein mixtures such as casein or gelatin. In general, preference is given to thickeners that do not fall under the term "microplastics" as defined above.

In some embodiments, suitable thickeners are particularly preferably selected from the group consisting of xanthan gum, sodium hyaluronate, polyvinyl alcohol (PVA 80), lecithin, guar, alginate, starch and polyquaternium-10 (also known as "cellulose 2-hydroxyethyl 2-[2-hydroxy-3-(trimethylammonio)-propoxy]ethyl 2-hydroxy-3-(trimethylammonio)propyl ether chloride" and has the CAS number 81859-24-7. The compound is available, for example, under the trade name Antistatic 10 from 3V Sigma).

If the perfume oil storage composition comprises at least one thickener as a further component, this is, in some embodiments, preferably contained in the perfume oil storage composition in an amount of 0 to 5 wt. %, preferably in an amount of 0.2 to 3 wt. %, for example in an amount of 0.2; 0.3; 0.4; 0.5; 1.0; 1.1; 1.2; 1.3; 1.4; 1.5; 2.0; 2.5; or 3.0 wt. %, based in each case on the total weight of the perfume oil storage composition.

The thickeners can be used, for example, to set a viscosity or yield point in the agents, with the viscosity and/or yield point ensuring that the dispersed phase remains stably dispersed over long periods of time, i.e. neither sediments nor creams.

Dyes which are suitable for use in the perfume oil storage composition include all water-soluble and/or hydrophilic as well as water-insoluble and/or lipophilic dyes known in the art, in particular those which are suitable for washing, cleaning, care and/or finishing purposes as defined herein.

Rheology modifiers which can also be a further component of the perfume oil storage composition described herein include all rheology modifiers known in the prior art, in particular those which are suitable for washing, cleaning, care and/or finishing purposes. Examples of rheology modifiers include, but are not limited to, alginate, carageenan, cellulose derivatives, succinoglucans, and acrylates. However, particular preference is given to rheology modifiers that do not fall under the term "microplastics" as defined above, such as polysaccharide-based rheology modifiers. In various embodiments, the thickeners mentioned above, such as xanthan gum, can also be used/considered as rheology modifiers.

If the perfume oil storage composition, as defined herein, comprises at least one other component, which is selected from the group consisting of surfactants, thickeners, dyes and rheology modifiers, as defined above, the additional components mentioned are explained below with reference to the preparation method incorporated into a composition.

A method for preparing a perfume oil storage composition as defined and described above may include
a) providing a mixture comprising at least one low-molecular gelling agent as defined above and at least one perfume oil;
b) dispersing the mixture from step a) in water or an aqueous solution to obtain a dispersion, optionally an oil-in-water emulsion, the dispersed phase of which comprises the at least one low-molecular gelling agent and the at least one perfume oil.

It may be preferable to heat one or more of the individual components which are required and used for providing a mixture comprising at least one low-molecular gelling agent, as defined above, and at least one perfume oil according to step a) of the method, the individual components being the at least one low-molecular gelling agent and the at least one perfume oil as defined herein. Accordingly, in some embodiments, step a) of a preparation method comprises heating one or more components to a temperature of approximately 30° C. to approximately 130° C., preferably to a temperature of approximately 60° C. to approximately 100° C., for example to a temperature of approximately 60, 61, 62, 63, 64, 65, 70, 75, 80, 85, 90, 95 or 100° C. The heating of individual or all components of the mixture according to step a) can simplify and/or accelerate the preparation of such a homogeneous mixture.

In some embodiments of the preparation method, it can also be advantageous if the mixture obtained from step a) and/or the water or the aqueous solution according to step b) is heated. Accordingly, in some embodiments, the dispersing according to step b) of the preparation method comprises heating the mixture from step a) and/or the water or the aqueous solution to a temperature of approximately 30° C. to approximately 130° C., preferably to a temperature of approximately 60° C. to approximately 100° C., for example to a temperature of approximately 60, 61, 62, 63, 64, 65, 70, 75, 80, 85, 90, 95 or 100° C. The heating of individual or all of the components used in step b) can simplify and/or accelerate the preparation of a stable dispersion.

If a perfume oil storage composition contains one or more dyes, they can be part of the dispersed phase and/or the continuous phase and are accordingly added to the corresponding phase in step a) of the method or step b) of the method. In this case, preferably lipophilic and/or water-insoluble dyes are chosen as a component of the oil phase and hydrophilic and/or water-soluble dyes as a component of the aqueous phase.

The mixing/stirring or dispersing of the respective components, such as according to step a) or step b) of the method, is not limited to specific techniques and can include, for example, the use of vortex devices or stirrers, the use of spoons, spatulas or the like.

According to some embodiments, in a method for preparing the perfume oil storage composition described, step b) of the method consists of the following steps:
b1) dispersing the mixture from step a) in an aqueous solution of at least one thickener; and
b2) stirring the dispersion from step b1) into an aqueous solution of at least one surfactant and/or at least one rheology modifier.

According to some other embodiments, step b) of the method consists of the following steps:

b1.1) dispersing the mixture from step a) in an aqueous solution of at least one surfactant and/or at least one rheology modifier; and b2.1) stirring the dispersion from step b1.1) into an aqueous solution of at least one thickener.

According to further embodiments, step b) of the method consists of step b1) or step b1.1).

Thickeners which, in some embodiments, are incorporated into a perfume oil storage composition in step b1) have been defined and described above. In corresponding embodiments, the at least one thickener, as an additional component of the perfume oil storage composition, is a component of the continuous phase and is used for thickening. By using at least one thickener, as defined above, the oil-in-water emulsion can be additionally stabilized.

Surfactants and/or rheology modifiers which, in some embodiments, are incorporated into a perfume oil storage composition in step b2) have been defined and described above. In corresponding embodiments, the at least one surfactant and/or the at least one rheology modifier, as an additional component of the perfume oil storage composition, is a component of the continuous phase and serves to sterically stabilize the dispersed phase. By using at least one surfactant and/or at least one rheology modifier, as defined above, the oi-in-water emulsion can be accordingly additionally stabilized.

In some embodiments, it may be advantageous if the dispersing according to step b1) or step b1.1) and/or the stirring according to step b2) or step b2.1) comprises heating the mixture from step a) and/or the relevant aqueous solution to a temperature of approximately 30° C. to approximately 130° C., preferably to a temperature of approximately 60° C. to approximately 100° C., for example to a temperature of approximately 60, 61, 62, 63, 64, 65, 70, 75, 80, 85, 90, 95 or 100° C. In this way, the preparation of a dispersion or oil-in-water emulsion can be simplified and/or accelerated.

A perfume oil storage composition can be prepared by means of a method as described above. The embodiments described at that point as being preferred for low-molecular gelling agents, perfume oil, thickeners, surfactants, rheology modifiers and dyes also apply to the method.

A low-molecular gelling agent may be used for stabilizing at least one perfume oil in water or in an aqueous solution. The use of a low-molecular gelling agent as a component of the dispersed phase, as explained above, allows the preparation of stable oil-in-water emulsions in which the at least one low-molecular gelling agent, as a component of the dispersed phase, and the at least one perfume oil in the form of finely divided particles/droplets are present in the continuous phase. In these embodiments, both the gelling agent and the perfume oil are preferably as defined above. In such embodiments, the gelling agent also preferably forms a matrix or shell which encloses the perfume oil, so that corresponding particles of gelling agent and perfume oil are produced.

When assembling an end product, for example a washing, cleaning or treatment agent, such as a particulate washing or cleaning agent, a liquid washing or cleaning agent, a softener or a scenting product, such as scented pastilles for use in textile washing, it is possible both to use the perfume oil storage composition at different points/times of the assembling process of the relevant product, as well as to leave the final assembling of the finished product to the consumer himself by giving him several perfume oil storage compositions with different benefit products as well as a washing, cleaning or treatment basic agent and the consumer mixing the required washing, cleaning or treatment agent himself, in accordance with the operation of a modular system.

An agent may include a perfume oil storage composition as described herein, the agent being a washing, cleaning or treatment agent, for example a cosmetic product, washing, cleaning or textile treatment agent.

Agents are suitable for washing, cleaning, conditioning, caring for and/or dyeing hard or soft surfaces. Within the context of this application, agents can consequently be washing, cleaning, aftertreatment agents and/or cosmetic agents.

Within the meaning of this application, hard surfaces are windows, mirrors and other glass surfaces, surfaces made of ceramic, plastics material, metal or wood and lacquered wood, which are found in the household and commercial sectors, such as bathroom ceramics, cooking and dining utensils, kitchen surfaces or floors. Within the meaning of this application, soft surfaces are textile sheet materials, skin and hair.

Within the meaning of this application, agents for washing hard or soft surfaces are textile washing agents, for example formulations in the form of powders, granules, beads, tablets, pastes, gels, wipes, bars or liquids.

Within the meaning of this application, agents for cleaning hard or soft surfaces include all cleaners for hard or soft surfaces, in particular dishwashing detergents, all-purpose cleaners, toilet cleaners, sanitary cleaners and glass cleaners, toothpastes, skin washing agents, such as shower gels, or hair washing agents.

Within the meaning of this application, agents for conditioning hard or soft surfaces are fabric softeners, rimblocks, conditioning wipes for use in tumble dryers, hygiene rinsers, deodorants, antiperspirants, hair-conditioning agents, styling agents and/or hair setting agents.

Within the meaning of this application, agents for caring for hard or soft surfaces are textile care products, hair care agents or skin treatment agents, such as creams, lotions or gels.

Within the meaning of this application, agents for dyeing hard or soft surfaces are hair dyeing and hair toning agents and agents for lightening keratin fibers.

In a preferred embodiment, the surface is a textile surface. When the surface is a textile surface, it is particularly preferable for the agent for washing, cleaning, conditioning, caring for and/or dyeing hard or soft surfaces to be a washing agent, cleaning agent or post-treatment agent.

In a further embodiment, the surface is a body part, in particular skin and/or hair. When the surface is a body part, in particular skin and/or hair, it is preferable for the agent for washing, cleaning, conditioning, caring for and/or dyeing hard or soft surfaces to be a cosmetic composition.

An agent comprises at least one type of a perfume oil storage composition as defined and described herein. In preferred embodiments, such an agent contains at least one perfume oil storage composition in an amount of up to approximately 20 wt. %, preferably up to approximately 10 wt. %, more preferably up to approximately 7 wt. %, yet more preferably up to approximately 5 wt. %, in particular up to approximately 2 wt. %.

In addition to the perfume oil storage composition described herein, an agent can further contain conventional ingredients and other ingredients known per se to a person skilled in the art, for example at least one or preferably more substances from the group of enzymes, surfactants, bleaching agents, complexing agents, builders, electrolytes, non-aqueous solvents, pH adjusters, other fragrant substances, other fragrance carriers, fluorescing agents, dyes, hydrotropic substances, suds suppressors, silicone oils, anti-redeposition agents, graying inhibitors, anti-shrink agents, anti-crease agents, dye transfer inhibitors, antimicrobial active ingredients, germicides, fungicides, antioxidants, corrosion inhibitors, antistatic agents, bittering agents, ironing aids, repellents and impregnating agents, anti-swelling and anti-slip agents, softening components and UV absorbers.

A perfume oil storage composition may be used for treating surfaces and/or in textile washing and/or in textile care, as defined above, and to a method for treating a surface or for washing and/or caring for textiles, characterized in that an agent, as described above, is used in at least one method step.

All substantive matter, subjects, and embodiments described for perfume oil storage compositions described herein are also applicable to the above-mentioned methods, uses, and agents containing these compositions. Therefore, reference is expressly made at this point to the disclosure at the appropriate point with the note that this disclosure also applies to the above-described methods and uses.

The invention is described in the following with reference to examples, but is not limited to these examples.

EXAMPLES

Examples of formulations and comparison formulations are listed in the following. Corresponding formulations were tested for their odor quality (i.e. intensity) and stability in performance test series. The corresponding results are summarized in a table.

Example 1: Preparation of Perfume Oil Storage Compositions

TABLE 1

| Ingredients | E1 Content [wt. %] | E2 Content [wt. %] |
|---|---|---|
| Perfume oil | 3.86* | 10.0* |
| Xanthan gum | 0.30* | 0.30* |
| SDS | 0.24* | 0.24* |
| 12-HSA | 10.0** | — |
| Water | To make up to 100 | to make up to 100 |

TABLE 2

| Ingredients | E3 Content [wt. %] |
|---|---|
| Perfume oil | 3.86* |
| CTAB | 0.3* |
| 12-HSA | 10.0** |
| Water | To make up to 100 |

TABLE 3

| Ingredients | E4 Content [wt. %] |
|---|---|
| Perfume oil | 3.86* |
| CTAB | 0.30* |
| DBS | 0.70** |
| Water | To make up to 100 |

TABLE 4

| Ingredients | E5 Content [wt. %] |
|---|---|
| Perfume oil | 7.7* |
| CTAB | 0.30* |
| L-Phe-L-His | 4.0** |
| Water | To make up to 100 |

*based on the total weight of the composition (emulsion)
**based on the total weight of the oil phase In order to prepare the perfume oil storage composition E1, the low-molecular gelling agent (here: 12-HSA) was dissolved in perfume oil at 75° C. The mixture obtained in this way was dispersed with vigorous stirring (800 rpm) in an aqueous solution of the thickener (here: xanthan gum) which had previously been heated to 70° C. The dispersion obtained in this way was then added at 70° C. with slow stirring to an aqueous solution of the stabilizer (here: SDS), which had previously been heated to 70° C. Upon cooling to room temperature, a stable dispersion was formed within approximately 2 hours.

In order to prepare E3, the low-molecular gelling agent (12-HSA) was dissolved in perfume oil at 75° C. The mixture obtained in this way was dispersed with ultrasound (20 kHz, 100 W) for a total of 6 min in an aqueous solution of the surfactant cetyltrimethylammonium bromide (CTAB) which had previously been heated to 70° C. Upon cooling to room temperature, the sample was stirred slowly with the magnetic stirrer until approximately 25° C. was reached.

In order to prepare E4, the low-molecular gelling agent (DBS) was dissolved in propylene glycol (PG) and a 10% solution was prepared. This solution was dissolved in perfume oil at 80° C. The mixture obtained in this way was dispersed with ultrasound (20 kHz, 100 W) for a total of 6 min in an aqueous solution of the surfactant (CTAB) which had previously been heated to 80° C. Upon cooling to room temperature, the sample was stirred slowly with the magnetic stirrer until approximately 25° C. was reached.

In order to prepare E5, the low-molecular gelling agent group E (diketopiperazine) (L-Phe-L-His) was dissolved in propylene glycol (PG) and a 10% solution was prepared. This solution was dissolved in perfume oil at 80° C. The mixture obtained in this way was dispersed with ultrasound (20 kHz, 100 W) for a total of 6 min in an aqueous solution of the surfactant (CTAB) which had previously been heated to 80° C. Upon cooling to room temperature, the sample was stirred slowly with the magnetic stirrer for 12 hr.

Example 2: Determining the Diameter of the Dispersed Phase (Particles)

The diameters of the dispersed particles were determined using optical light microscopy or dynamic light scattering (DLS, Malvern Zetasizer). For this purpose, a lipophilic dye (Sudan Red) was added to the mixture of 12-HSA and perfume oil during the preparation of the composition E1 in order to make the particles visible under the light microscope. The measurement was made approximately 2 hours after the emulsion was prepared. The diameter of the particles was between 30 μm and 80 μm and did not change significantly even after repeated measurements several weeks later.

As a reference, an emulsion was prepared analogously to composition E1 without 12-HSA but with the same amount of 1,2-propylene glycol. Without the addition of 12-HSA, the diameter of the particles is between 100 μm and 500 μm. The dispersion formed is only stable for a few days.

Moreover, the matrix encapsulation of perfume of composition E1 was made visible using scanning electron microscopy. The diameter of the matrix encapsulation was thus determined to be between 3 μm and 20 μm.

Example 3: Determining Perfume Oil Release

In order to determine the release of the perfume oil content from the composition with and without encapsulation, TGA-IR measurements (thermogravimetry combined with IR measurements) were carried out.

The weight reduction was determined during the isothermal heating run at 40° C. in a nitrogen atmosphere over 24 hours. The gas stream emerging from the TGA was examined by means of FTIR spectroscopy (Fourier transform infrared spectroscopy) with regard to released gas components.

In order to determine the pure perfume oil, a first reference measurement was carried out without gelator and without stabilizers (thickeners and stabilizing means). Bands of an ester compound (e.g. hexyl acetate or pentyl acetate) were found.

In the tests of the samples with and without encapsulation (composition E1 or composition analogous to E1 without 12-HSA but with the same amount of 1,2-propylene glycol), the aliphatic $CH_x$ bands were each assigned to the perfume oil. The integrals of the corresponding peaks were plotted against time to determine the release of the perfume oil (FIG. 1). FIG. 1 shows that the encapsulated sample releases perfume oil to a lesser extent and more slowly than the non-encapsulated sample.

The invention claimed is:

1. A perfume oil storage composition comprising:
   at least one low-molecular gelling agent;
   at least one perfume oil; and
   water,
   wherein the composition is a dispersion, the dispersed phase of which comprises the at least one low-molecular gelling agent and the at least one perfume oil, and
   wherein the at least one low-molecular gelling agent is selected from the group consisting of:
   A) compounds selected from the group consisting of benzylidene alditols of formula (I):

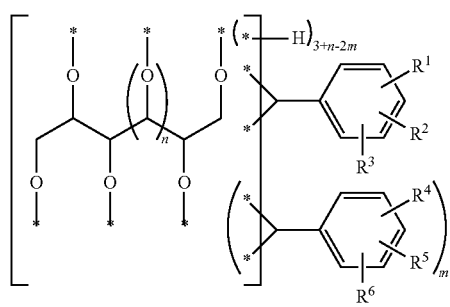

wherein
      each * represents a covalent single bond between an oxygen atom of the alditol backbone and the provided group;
      n is 0 or 1;
      m is 0 or 1;
      $R^1$, $R^2$ and $R^3$ are each, independently, hydrogen, halogen, $C_1$-$C_4$ alkyl, cyano, nitro, amino, carboxyl, hydroxyl, —C(=O)—NH—$NH_2$, —NH—C(=O)—($C_2$-$C_4$ alkyl), $C_1$-$C_4$ alkoxy, or ($C_1$-$C_4$ alkoxy) ($C_2$-$C_4$ alkyl), wherein two of $R^1$, $R^2$ and $R^3$ are capable of forming, together with the remainder of the molecule, a 5-membered or 6-membered ring; and
      $R^4$, $R^5$ and $R^6$ are each, independently, hydrogen, halogen, $C_1$-$C_4$ alkyl, cyano, nitro, amino, carboxyl, hydroxyl, —C(=O)—NH—$NH_2$, —NH—C(=O)—($C_2$-$C_4$ alkyl), $C_1$-$C_4$ alkoxy, or ($C_1$-$C_4$ alkoxy) ($C_2$-$C_4$ alkyl), wherein two of $R^4$, $R^5$ and $R^6$ are capable of forming, together with the remainder of the molecule, a 5-membered or 6-membered ring;
   B) hydrogenated castor oil;
   C) compounds selected from the group consisting of diarylamidocystines of formula (II):

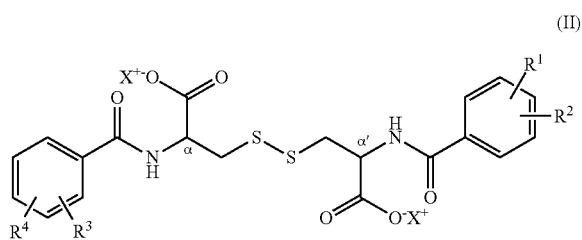

wherein
      each X' is, independently, hydrogen or an equivalent of a cation; and
      $R^1$, $R^2$, $R^3$ and $R^4$ are each, independently, hydrogen, halogen, $C_1$-$C_4$ alkyl, $C_1$-$C_4$ alkoxy, $C_2$-$C_4$ hydroxyalkyl, hydroxyl, amino, —N—($C_1$-$C_4$ alkyl), —N,N-di ($C_1$-$C_4$ alkyl) amino, —N—($C_2$-$C_4$ hydroxyalkyl) amino, or —N,N-di($C_2$-$C_4$ hydroxyalkyl) amino,
      or $R^1$ with $R^2$ or $R^3$ with $R^4$ forms a 5- or 6-membered annulated ring, which can optionally be substituted with at least one group selected from the group consisting of $C_1$-$C_4$ alkyl, $C_1$-$C_4$ alkoxy, $C_2$-$C_4$ hydroxyalkyl, hydroxyl, amin, —N—($C_1$-$C_4$ alkyl) amino, —N,N-di($C_1$-$C_4$ alkyl) amino, —N—($C_2$-$C_4$ hydroxyalkyl) amino, and —N,N-di($C_2$-$C_4$ hydroxyalkyl) amino;
   D) compounds selected from the group consisting of N-alkylgluconamides of formula (III):

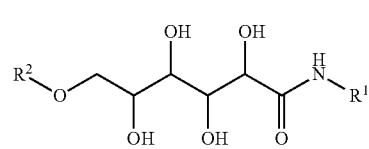

wherein
      $R^1$ is linear or branched, substituted or unsubstituted $C_4$-$C_{12}$ alkyl, wherein each substituent is independently selected from the group consisting of F, Cl, Br and I; and
      $R^2$ is hydrogen or a substituted or unsubstituted benzoyl group, wherein each substituent is independently selected from the group consisting of F, Cl, Br, I, $C_1$-$C_3$ alkyl and $C_1$-$C_3$ alkoxy;

E) compounds selected from the group consisting of 2,5-diketopiperazines of formula (IV):

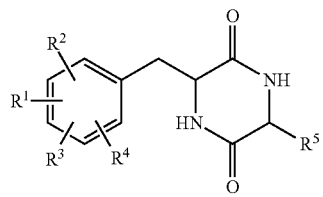

(IV)

wherein
  $R^1$, $R^2$, $R^3$ and $R^4$ are each, independently, hydrogen, hydroxyl, ($C_1$-$C_6$) alkyl, ($C_2$-$C_6$) alkenyl, ($C_2$-$C_6$) acyl, ($C_2$-$C_6$) acyloxy, ($C_1$-$C_6$) alkoxy, amino, ($C_2$-$C_6$) acylamino, ($C_1$-$C_6$) alkylaminocarbonyl, aryl, aroyl, aroyloxy, aryloxy, aryl-($C_1$-$C_4$) alkyloxy, aryl-($C_1$-$C_3$) alkyl, heteroaryl, heteroaryl-($C_1$-$C_3$) alkyl, ($C_1$-$C_4$) hydroxyalkyl, ($C_1$-$C_4$) aminoalkyl, or carboxy-($C_1$-$C_3$) alkyl, wherein at least two of $R^1$, $R^2$, $R^3$ and $R^4$ are capable of forming, together with the remainder of the molecule, a 5-membered or 6-membered ring; and
  $R^5$ is hydrogen, linear ($C_1$ to $C_6$) alkyl, branched ($C_3$ to $C_{10}$) alkyl, ($C_3$ to $C_6$) cycloalkyl, ($C_2$-$C_6$) alkenyl, ($C_2$-$C_6$) alkynyl, ($C_1$-$C_4$) hydroxyalkyl, ($C_1$-$C_4$) alkoxy-($C_1$-$C_4$) alkyl, ($C_1$-$C_4$) acyloxy-($C_1$-$C_4$) alkyl, aryloxy-($C_1$-$C_4$) alkyl, O-(aryl-($C_1$-$C_4$) alkyl)oxy-($C_1$-$C_4$) alkyl, ($C_1$-$C_4$) alkylsulfanyl-($C_1$-$C_4$) alkyl, aryl group, aryl-($C_1$-$C_3$) alkyl, heteroaryl, heteroaryl-($C_1$-$C_3$) alkyl, ($C_1$-$C_4$) hydroxyalkyl, ($C_1$-$C_4$) aminoalkyl, —N—($C_1$-$C_4$) alkylamino-($C_1$-$C_4$) alkyl, —N,N—($C_1$-$C_4$) dialkylamino-($C_1$-$C_4$) alkyl, —N—($C_2$-$C_8$) acylamino-($C_1$-$C_4$) alkyl, —N—($C_2$-$C_8$) acyl-N—($C_1$-$C_4$) alkylamino-($C_1$-$C_4$) alkyl, —N—($C_2$-$C_8$) aroyl-N—($C_1$-$C_4$) alkylamino-($C_1$-$C_4$) alkyl, —N,N—($C_2$-$C_8$) diacylamino-($C_1$-$C_4$) alkyl, —N-(aryl-($C_1$-$C_4$) alkyl)amino-($C_1$-$C_4$) alkyl, —N,N-di(aryl-($C_1$-$C_4$) alkyl)amino-($C_1$-$C_4$) alkyl, ($C_1$-$C_4$) carboxyalkyl, ($C_1$-$C_4$) alkoxycarbonyl-($C_1$-$C_3$) alkyl, ($C_1$-$C_4$) acyloxy-($C_1$-$C_3$) alkyl, guanidino-($C_1$-$C_3$) alkyl, aminocarbonyl ($C_1$-$C_4$) alkyl, —N—($C_1$-$C_4$) alkylaminocarbonyl-($C_1$-$C_4$) alkyl, —N,N-di (($C_1$-$C_4$)alkyl)aminocarbonyl-($C_1$-$C_4$) alkyl, —N—($C_2$-$C_8$) acylaminocarbonyl-($C_1$-$C_4$) alkyl, —N,N—($C_2$-$C_8$) diacylaminocarbonyl-($C_1$-$C_4$) alkyl, —N—($C_2$-$C_8$) acyl-N—($C_1$-$C_4$) alkylaminocarbonyl-($C_1$-$C_4$) alkyl, —N-(aryl-($C_1$-$C_4$) alkyl) aminocarbonyl-($C_1$-$C_4$) alkyl, —N-(aryl-($C_1$-$C_4$) alkyl)-N—($C_1$-$C_6$) alkylaminocarbonyl-($C_1$-$C_4$) alkyl or —N,N-di(aryl-($C_1$-$C_4$)alkyl)aminocarbonyl-($C_1$-$C_4$) alkyl group; and
F) compounds selected from the group consisting of glucosamines of formula (V):

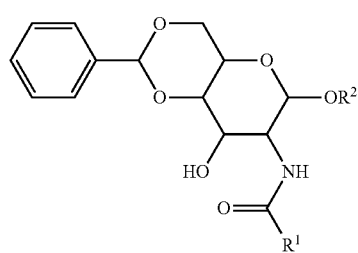

(V)

wherein
  $R^1$ is a vinyl containing group; and
  $R^2$ is hydrogen or a substituted or unsubstituted $C_1$-$C_{10}$ hydrocarbon group.

2. The perfume oil storage composition of claim 1, wherein the dispersed phase is in the form of particles, and wherein the at least one low-molecular gelling agent forms a matrix or shell enclosing the at least one perfume oil.

3. The perfume oil storage composition according to of claim 1, wherein:
  i) the at least one low-molecular gelling agent is present in an amount ranging from about 0.1 wt. % to about 20 wt. %, based on the total weight of the composition,
  (ii) the at least one perfume oil is contained in an amount ranging from about 1 wt. % to about 50 wt. %, based on the total weight of the composition, or
  both (i) and (ii).

4. The perfume oil storage composition according to of claim 1, wherein the composition further comprises at least one additional ingredient selected from the group consisting of a surfactant, a thickener, a dye, a rheology modifier, and any combination thereof.

5. The perfume oil storage composition of claim 4, wherein:
  the surfactant is selected from the group consisting of sodium dodecyl sulfate (SDS), cetyltrimethylammonium bromide (CTAB), cetyltrimethylammonium chloride (CTAC), 1-acetoxy-2-stearoyloxyethane (AGS), sodium taurocholate, polysorbate 80 (Tween 80), sorbitan monolaurate (Span 20), and any combination thereof;
  the surfactant is present in the composition in an amount ranging from about 0.01 wt. % to about 15 wt. %, based on the total weight of the composition;
  the thickener is selected from the group consisting of xanthan gum, sodium hyaluronate, polyvinyl alcohol (PVA 80), lecithin, guar, alginate, starch, cellulose 2-hydroxyethyl 2-[2-hydroxy-3-(trimethylammonio)-propoxy]ethyl 2-hydroxy-3-(trimethylammonio) propyl ether chloride, and any combination thereof; and/or
  the thickener is present in the composition in an amount ranging from about 0.2 wt. % to about 5 wt. %, based on the total weight of the composition.

6. The perfume oil storage composition of claim 1, wherein the at least one low-molecular gelling agent is selected from the group consisting of 12-hydroxystearic acid (12-HSA), dibenzylidene sorbitol (DBS), and a compound of formula (IV), wherein $R^1$, $R^2$, $R^3$ and $R^4$ are H and $R^5$ is 4-imidazolylmethyl.

7. The perfume oil storage composition of claim 1, wherein the particles of the dispersed phase are microparticles having a mean diameter $d_{50}$ ranging from about 1 μm to about 400 μm.

8. A method for preparing the perfume oil storage composition of claim 1, the method comprising:
  a) providing a mixture comprising the at least one low-molecular gelling agent and the at least one perfume oil; and
  b) dispersing the mixture in the water or an aqueous solution including the water to form an oil-in-water emulsion.

9. The method of claim 8, wherein the dispersing the mixture in the water or the aqueous solution including the water comprises:
  dispersing the mixture in an aqueous solution of at least one thickener; and stirring the dispersion into an aqueous solution of at least one surfactant and/or at least one rheology modifier.

10. The method of claim 9, wherein:
providing the mixture comprises heating one or more components of the mixture to a temperature ranging from about 30° C. to about 130° C.;
dispersing the mixture in the water or the aqueous solution including the water comprises heating the mixture and/or the water or the aqueous solution to a temperature ranging from about 30° C. to about 130° C.; and/or
stirring the dispersion comprises heating the mixture and/or the aqueous solution to a temperature ranging from approximately 30° C. to approximately 130° C.

11. A washing, cleaning, or treatment agent comprising:
the perfume oil storage composition of claim 1; and
at least one component selected from the group consisting of enzymes, surfactants, bleaching agents, complexing agents, builders, electrolytes, non-aqueous solvents, pH adjusters, other fragrant substances, fragrant substance carriers, fluorescing agents, dyes, hydrotropes, suds suppressors, silicone oils, anti-redeposition agents, graying inhibitors, shrinkage inhibitors, anti-crease agents, dye transfer inhibitors, antimicrobial active ingredients, germicides, fungicides, antioxidants, corrosion inhibitors, antistatic agents, bittering agents, ironing aids, repellents and impregnating agents, swelling and non-slip agents, softening components, UV absorbers, and any combination thereof.

12. A method of washing, cleaning or treating a surface or a textile, the method comprising:
applying the washing, cleaning or treating article of claim 11 to the surface or the textile; and
washing, cleaning or treating the surface or the textile.

13. The perfume oil storage composition of claim 1, wherein n is 1, m is 1, $R^1$ is a (meth)acrylate group, and $R^2$ is hydrogen, ethyl, or methyl.

14. The perfume oil storage composition of claim 3, wherein the at least one low-molecular gelling agent is present in an amount ranging from about 0.5 wt. % to about 10 wt. %, based on the total weight of the composition.

15. The perfume oil storage composition of claim 5, wherein the surfactant is present in the composition in an amount ranging from about 0.01 wt. % to about 5 wt. %, based on the total weight of the composition, and the thickener is present in the composition in an amount ranging from about 0.2 wt. % to about 3 wt. %, based on the total weight of the composition.

16. The perfume oil storage composition of claim 7, wherein the particles of the dispersed phase are microparticles and have a mean diameter $d_{50}$ ranging from about 1 μm to about 200 μm.

17. The method of claim 10, wherein the temperature ranges from about 60° C. to about 100° C. during any one or more of the providing, dispersing, or stirring steps.

18. A perfume oil storage composition comprising:
a low-molecular gelling agent selected from the group consisting of 12-hydroxystearic acid (12-HSA), dibenzylidene sorbitol (DBS), and L-Phe-L-His;
at least one perfume oil;
a surfactant selected from the group consisting of cetyltrimethylammonium bromide (CTAB) and sodium dodecyl sulfate (SDS);
water; and
optionally, a thickener comprising xanthan gum,
wherein the composition is a dispersion, the dispersed phase of which comprises the low-molecular gelling agent and the at least one perfume oil.

* * * * *